United States Patent [19]

Kumar et al.

[11] Patent Number: 5,229,179
[45] Date of Patent: Jul. 20, 1993

[54] GENERAL PURPOSE SILOXANE RELEASE COATINGS

[75] Inventors: Ramesh C. Kumar, Maplewood; Steven S. Kantner, St. Paul, both of Minn.

[73] Assignee: Minnesota Mining and Manufacturing Company, St. Paul, Minn.

[21] Appl. No.: 905,174

[22] Filed: Jun. 24, 1992

Related U.S. Application Data

[60] Continuation of Ser. No. 827,441, Jan. 29, 1992, abandoned, which is a division of Ser. No. 393,557, Aug. 14, 1989, Pat. No. 5,089,336.

[51] Int. Cl.$^5$ .............. B32B 7/06; B32B 7/12; B32B 7/14; C09J 7/02
[52] U.S. Cl. ................... 428/40; 428/181; 428/189; 428/194; 428/195; 428/202; 428/352
[58] Field of Search .............. 428/40, 181, 189, 194, 428/195, 202, 352

[56] References Cited

U.S. PATENT DOCUMENTS 5,071,936 12/1991 Himori .................. 528/26
5,089,336 2/1992 Kumor .................. 428/352

FOREIGN PATENT DOCUMENTS 0386615 9/1990 European Pat. Off. .

Primary Examiner—James C. Cannon
Attorney, Agent, or Firm—Gary L. Griswold; Walter N. Kirn; Janice L. Dowdall

[57] ABSTRACT

Iniferter prepared release coating compositions comprising vinyl-siloxane block copolymer and blends thereof with other polymeric materials on sheet materials and the backside of adhesive tapes are provided. Controlled and predictable release is obtained through variation of the molecular weight and weight percent of the siloxane block as well as the molecular weight and composition of the vinyl block or blocks.

6 Claims, No Drawings

GENERAL PURPOSE SILOXANE RELEASE COATINGS

This is a continuation of application Ser. No. 07/827,441 filed Jan. 29, 1992, which is a division of application Ser. No. 07/393,557 filed Aug. 14, 1989, now U.S. Pat. No. 5,089,336.

FIELD OF THE INVENTION

This invention relates to low adhesion backsize and release coatings of the type employed in connection with normally tacky and pressure-sensitive adhesive tape. The invention also relates to adhesive-coated sheet material provided with such coatings.

BACKGROUND OF THE INVENTION

Normally tacky and pressure-sensitive adhesive (PSA) materials have been used for well over half a century. Products of this type, which take the form of tapes, labels, and other types of adhesive coated sheets, must be protected from unintended adhesion to other surfaces. Hence, tapes are typically wound into a roll on their own backing and labels are typically laminated to a release sheet to prevent their accidental adhesion to other surfaces and also to prevent their contamination with air-borne dust and other contaminants. In order to allow the roll to be unwound without the undesirable transfer of adhesive to the tape backing, it is customary to provide the tape backing with a low adhesion backsize (LAB). Similarly, the release sheet or liner to which the adhesive coated label is typically laminated is supplied with a release coating to permit the easy removal of the liner from the label.

This LAB or release coating is expected to reproducibly provide an appropriate level of release from the adhesive of interest, to not deleteriously affect the adhesive, and to be resistant to aging so that the release level remains relatively stable with time. In recent years, as competition has expanded in the PSA industry, a need to differentiate product performance as well as more demanding product requirements has lead to recognition of the importance of release level. D. Satas, Chapt. 23 "Release Coatings", *Handbook of Pressure Sensitive Adhesive Technology,* Second Edition, D. Satas, ed., Van Nostrand Reinhold, 1989, defines seven distinct levels of release, ranging from "super low release" (0.15–0.30 N/dm) to "very tight release" (20–80 N/dm). Even within a given category, such as "moderately tight release" (6–10 N/dm), consumer preference demands a tighter unwind for a roll of office tape in Europe and Japan than in North America, allowing the manufacturer who has a means of easily adjusting the level of release the opportunity to compete on a global basis.

In many circumstances it is important for the LAB to possess other properties besides functioning as a release agent. For example, the release coating on masking tape must possess good solvent resistance in addition to providing a surface to which paint can adhere.

Long chain linear and branched hydrocarbon polymers find widespread use as low adhesion backsizes for pressure sensitive tapes. The alkyl side chain of these acrylate (U.S. Pat. No. 2,607,711), methacrylate (U.S. Pat. No. 3,502,497 and U.S. Pat. No. 4,241,198) vinyl ester (U.S. Pat. No. 2,829,073), vinyl carbamate (U.S. Pat. No. 2,532,011), etc., copolymers apparently crystallizes to form a waxy low energy surface to which the adhesive adheres poorly. These various polymeric release coatings are not universal, in that none of them show desirable release performance for every type of PSA. In addition, the range of release level possible with these polymers is fairly limited.

Fluorocarbon copolymers also provide low surface energy coatings which find utility in certain specialty applications (U.S. Pat. No. 3,318,852), but also lack universality and release level tailorability.

Silicones are widely used for release liner applications due to the fact that they provide easy release for a wide variety of PSA types. Silicones are generally less useful as LABs in tape constructions, however, where tighter release levels are desirable. To increase their usefulness in LAB tape constructions, organosiloxane has been blended with a variety of film forming coating materials such as nitrocellulose (U.S. Pat. No. 2,985,554), alkyl ether-maleic anhydride copolymers (U.S. Pat. No. 3,770,687 and U.S. Pat. No. 3,823,025), vinyl alkyl carbamate copolymers (U.S. Pat. No. 3,679,458), etc., to tighten release. In addition, silicones can be modified with epoxy groups to make them more polar (U.S. Pat. No. 4,313,988) hence providing tighter release. Silicones can also be cocured with isocyanates (U.S. Pat. No. 3,957,724), polybutadiene (U.S. Pat. No. 4,261,876), acrylic emulsions (U.S. Pat. No. 3,933,702), etc., to tighten release.

Release coating compositions based on polysiloxane grafted copolymers that do not require a curing step have been described (U.S. Pat. No. 4,728,571) wherein controlled and predictable release is achieved through variation in the number and the length of the polysiloxane grafts.

Polymers having at least one polymeric siloxane segment and at least one hydrophilic vinyl polymeric segment prepared by other means than by use of the so-called "iniferter" technique have been shown to demonstrate utility as release coatings that are capable of being written on effectively with water-based and oil-based pen inks as described in copending U.S. patent application, Mertens, Ser. No. 07/278,283, filed Nov. 30, 1988 (assigned to the assignee of the present case), and now abandoned. Mertens, which is based upon a thermal method primarily relates to ink receptive copolymers. Mertens does not teach the preparation of ink receptive and non-ink receptive copolymers by use of iniferter technolgy and does not describe the broad utility of vinyl siloxane block copolymers for release coatings which are not ink receptive.

Various methods of preparing block copolymers of silicone and vinyl monomers have been described in the art. Crivello teaches a thermal method involving the use of a macromolecular siloxane initiator (U.S. Pat. No. 4,584,356) and describes utility as E-beam resists (U.S. Pat. No. 4,677,169) and positive or negative resists (U.S. Pat. No. 4,689,289). Eichenauer, et al describes condensation of either a semitelechelic hydroxy-terminal vinyl polymeric segment with an acetoxy-terminal siloxane (DE 3,606,984) (publication date Sep. 10, 1987) or a semitelechelic carboxy-terminal vinyl polymeric segment with an aminopropyl-terminal siloxane (DE 3,606,983) (publication date Sep. 10, 1987). Japanese laid-open applications 63-57642 and 63-57644 describe the use of peroxy ester terminated siloxanes as macroinitiators for thermal preparation of vinyl-siloxane block copolymers. H. Inoue, et al, *J. Appl. Poly. Sci,* 35, 2039 (1988) describes properties of poly(methyl methacrylate)/siloxane block copolymers obtained from thermal polymerization using an azo-containing siloxaneamide macroinitiator.

These methods, while useful, involve reactions that are not easily controlled. Since the reactions are not easily controlled, the copolymers formed thereby cannot be easily tailored. The block polymers prepared by these methods have not been shown to be useful for release coatings for pressure sensitive adhesives and in particular have not shown that a range of release performance can be achieved for a variety of PSA types.

An article by Noshay and McGrath, entitled "Block Copolymers", Academic Press, New York, 1977, pp 156 to 162, which is hereby incorporated by reference discusses phase separation as it applies to silicone-vinyl block copolymers. Noshay does not teach the preparation of vinyl-siloxane block copolymers by use of iniferter technology. Rather, Noshay teaches the preparation of vinyl-siloxane block copolymers by use of anionic polymerization and condensation polymerization methods.

The present invention provides sheet materials having release coatings of iniferter-prepared vinyl-siloxane block copolymers and tape constructions having low adhesion backsizes of the same copolymers. The iniferter-prepared block copolymers which can be reliably produced, exhibit specific release properties toward tacky and pressure-sensitive adhesives throughout a broad range.

The term "iniferter" refers to a chemical compound that has a combined function of being a free radical initiator, transfer agent, and terminator, the term "iniferter" being a word formed by the underlined portions of the terms identifying these functions. This term and its use in the production of block copolymers is well known, particularly because of the work of Takayuki Otsu of the Department of Applied Chemistry, Osaka City University, Osaka, Japan. This work is discussed, for example, in an article by Otsu, et al entitled "Living Radical Polymerizations in Homogeneous Solution by Using Organic Sulfides as Photoiniferters", *Polymer Bulletin*, 7, 45–50 (1982), an article by Otsu, et al entitled "Living Mono- and Bi-radical Polymerizations in Homogeneous System, Synthesis of AB and ABA Type Block Copolymers", *Polymer Bulletin*, 11, 135–142 (1984), and in European Patent No. 0286376, published Oct. 12, 1988.

Copending U.S. application Ser. No. 07/212,594, Ali, et al., filed Jun. 28, 1988, (assigned to the assignee of the present case), and now abandoned, discloses the use of iniferter technology in the preparation of acrylic block copolymers having the requisite physical properties making them suitable for use in pressure-sensitive adhesive compositions. The control of the polymerization permits tailoring of the reinforced acrylic block copolymer to provide a balance of adhesion, cohesion, stretchiness and elasticity to make a successful pressure-sensitive adhesive. Copending U.S. application Ser. No. 07/212,594, filed Jun. 18, 1988, does not disclose siloxane iniferter compounds or the use of such iniferter compounds in the synthesis of vinyl-siloxane block copolymers.

Copending U.S. application Ser. No. 07/212,593, filed Jun. 26, 1988, Andrus Jr., et al., (also assigned to the assignee of the present case), now abandoned discloses the use of iniferter technology in the preparation of acrylic block copolymers which can be tailored to provide optical clarity and resistance to oxidative and photochemical degradation. The acrylic block copolymers disclosed in copending U.S. application Ser. No. 07/212,593 are employed to make shaped articles, sheet materials, and the like. Copending U.S. application Ser. No. 07/212,593 also does not disclose siloxane iniferter compounds or the use of such iniferter compounds in the synthesis of vinyl-siloxane block copolymers.

Despite the rather detailed description of making other block copolymers according to the above disclosures, there is no disclosure of the novel siloxane iniferter compounds or the vinyl-siloxane block copolymers made therewith claimed in copending U.S. application, Kumar, et al, Ser. No. 393,550, Siloxane Iniferter Compounds, Block Copolymers Made Therewith And A Method Of Making The Block Copolymers filed Aug. 14, 1989, now abandoned. Nor is there taught the use of such vinyl-siloxane block copolymers as release coatings for the coated sheet materials herein claimed.

Copending concurrently filed U.S. Application Kumar, et al, Siloxane Iniferter Compounds, Block Copolymers Made Therewith and a method of making the Block Copolymers, (also assigned to the assignee of the present case) incorporated by reference herein, teaches the utilization of a novel siloxane iniferter as a means of promoting, controlling and terminating polymerization of a vinyl-siloxane block copolymer.

The siloxane iniferters used in preparing vinyl-siloxane block copolymers useful as release coatings are macro "iniferters", as opposed to the iniferters of Otsu; Ali, et al, U.S. application Ser. No. 07/212,594; and Andrus Jr., et al., U.S. application Ser. No. 07/212,593, which are low molecular weight iniferters which do not contain a polymerized siloxane segment or any silicon for that matter. It is not apparent from the above references that a polymerized silicone or siloxane segment could be contained in an iniferter. Both the preparation and function of the "macro" siloxane iniferters useful in preparing vinyl-siloxane copolymers differ from the iniferters described in the references above.

The selection of the endblocker which can cooperate with the siloxane midblock segment to form the macro siloxane iniferter useful in preparing tailormade vinyl siloxane block copolymer is very critical and must be made in a way which will not diminish the effectiveness of the siloxane segment. The preparation of such a "macro" iniferter including the determination of useful endblocker in its preparation is not suggested by any of the above references.

The polymerized siloxane segment introduced into the "backbone" of the vinyl-siloxane copolymer by the photoiniferter polymerization technique is a midblock component. The endblocker, which caps the siloxane segment, is selected such that it reacts with the photoiniferter in order to form a "macro" siloxane iniferter compound. The bond between the photoiniferter and endblocker is broken upon exposure to ultraviolet radiation resulting in an initiator free radical and a terminator free radical. The initiator free radical is capable of polymerizing free radically polymerizable vinyl monomer in order to yield vinyl siloxane copolymer.

With respect to Ser. No. 07/212,594, Ali, et al., and 07/212,593, Andrus Jr., et al., both the midblocks and endblocks comprise polymerized acrylic monomers. It is not apparent that a polymerized siloxane segment could be included in an iniferter and polymer formed therewith. Otsu also does not teach "macro" siloxane iniferters or the preparation of vinyl-siloxane compolymers.

By using photoiniferter polymerization techniques, it is possible to obtain more complicated polymer architectures than are avaliable according to the method of Crivello. The thermally prepared block copolymers of Crivello cannot possess architecture beyond AB and ABA.

In addition, photoiniferter polymerization reactions are much more efficient than thermal polymerization methods in terms of providing cleaner block copolymers which are free from unwanted homopolymers. Moreover, photoiniferter polymerization methods can be used to form block copolymers ranging from very low to very high molecular weights. The photoiniferter method permits the tailoring of the siloxane midblock as well as the endblocks to satisfy customer needs which is not possible using Crivello's thermal method.

Release coatings and LABs are typically applied to their substrates at coating weights around 1 g/m$^2$. In order to obtain these thin coatings, dilute solutions (2 to 5% solids) of the coating compositions in organic solvents have traditionally been used. Recent efforts have been directed to delivering such coatings at high or 100% solids or from aqueous media, thus reducing the environmentally damaging hydrocarbon emissions, conserving precious natural resources, and lowering economic cost.

U.S. Pat. No. 3,933,702 eliminates the organic solvent that is present in most LAB formulations by cocuring 100% silicones with acrylic emulsions.

A drawback however, is that release is not tailorable for these LAB formulations. In addition, most LAB formulations require curing and in addition are not ink receptive.

Moreover, such compositions have limited pot lives. In addition, the need to monitor the degree of cure is disadvantageous. The technology of converting solvent borne release formulations to water compatible systems for basic segmented silicone-urea block copolymers is discussed in copending U.S. application Leir et al Ser. No. 07/300,346, filed Jan. 23, 1989 (assigned to the assignee of the present case), now abandoned. Leir does not teach the conversion of solvent borne iniferter prepared vinyl-siloxane release formulations to water compatible systems.

BRIEF DESCRIPTION OF THE INVENTION

The present invention relates to a coated sheet material comprising a flexible sheet material and a release coating covering at least a portion of one major surface thereof, wherein the release coating comprises a vinyl-siloxane block copolymer made by utilization of a novel siloxane iniferter as a means of promoting, controlling and terminating polymerization of the copolymer. The novel siloxane iniferter and vinyl siloxane block copolymer prepared therewith are described in copending U.S. application Ser. No. 393,550, Kumar, et al, Siloxane Iniferter Compounds, Block Copolymers Made Therewith, and a Method of Making the Block Copolymers filed Aug. 14, 1989, and now abandoned, hereby incorporated by reference (assigned to the assignee of the present case).

The present invention relates to a coated sheet material comprising:
(a) a flexible sheet; an
(b) a release coating covering at least a portion of one major surface of the flexible sheet wherein the release coating comprises a block copolymer having a formula selected from the group consisting of AB and ABA, wherein A comprises at least one vinyl polymeric block, wherein each polymeric block consists essentially of polymerized free radically polymerizable monomer, wherein each polymeric block has a $T_g$ or $T_m$ above about $-20°$ C. and wherein A comprises at least about weight percent of the block copolymer, wherein B is a siloxane polymeric block having a number average molecular weight above about 1000 and wherein the weight percent of said siloxane polymeric block is enough to provide said block copolymer with a surface release value not greater than about 50 Newtons/dm, and wherein the block copolymer has the formula

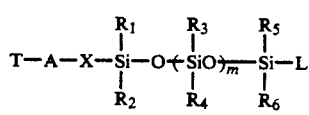

wherein the block copolymer is made by the utilization of an iniferter represented by the formula

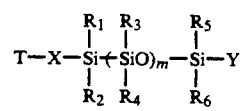

wherein:
T and X are organic groups selected so that the T—X bond is capable of dissociating upon being subjected to an appropriate energy source to form a terminator free radical of the formula T and an initiator free radical of the formula

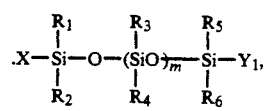

the initiator free radical being sufficiently reactive to initiate free radical polymerization of free radically polymerizable monomer and the terminator free radical being insufficiently capable of initiating free radical polymerization of free radically polymerizable monomer but capable of rejoining with the initiator free radical or a free radical polymer segment free radically polymerized with the initiator free radical;

$R_1$, $R_2$, $R_5$ and $R_6$ are monovalent moieties selected from the group consisting of hydrogen, $C_{1-4}$ alkyl, $C_{1-\alpha}$ alkoxy and aryl which can be the same or are different;

$R_3$ and $R_4$ are monovalent moieties which can be the same or different selected from the group consisting of $C_{1-4}$ alkyl, $C_{1-4}$ fluoroalkyl including at least one fluorine atom and aryl;

$R_1$, $R_2$, $R_3$, $R_4$, and $R_6$ are selected so that they do not prevent the initiator free radical from initiating free radical polymerization or the combining of the terminator free radical with the initiator free radical or a polymer free radical segment including the initiator free radical;

Y is selected from the group consisting of —X—T and —Z wherein X and T are defined above and Z is an organic moiety that will not dissociate to form free radicals when subjected to the energy source;

L is selected from the group consisting of —X—A—T and —Z wherein X and T are defined above and Z is an organic moiety that will not dissociate to form free radicals when subjected to the energy source;

$Y_1$ is selected from the group consisting of —X and —Z; and m is an integer of at least 10.

The siloxane polymeric block B must have a number average molecular weight above about 1000 in order for the release coating to function properly. Preferably, the siloxane polymeric block has a number average molecular weight of about 1,000 to about 20,000. Most preferably, the siloxane polymeric block has a number average molecular weight ranging from about 2,000 to about 15,000. The composition of the block copolymer is such as to provide the block copolymer with a surface release value not greater than about 50 N/dm.

It should be understood that this upper limit of 50 N/dm applies to use with highly aggressive pressure-sensitive adhesives (PSAs) which have peel adhesion values of 100 N/dm or higher. PSAs as a group fall into three broad categories (1) low (5-15 N/dm), (2) intermediate (25-50 N/dm), and (3) high (60-100 plus N/dm) peel adhesion ranges. It is apparent that the degree of release can be selected to match the aggressiveness of the PSA with which it will be in contact and it is only for the most aggressive PSAs that a release value as high as 50 N/dm would be selected. Release coatings for less aggressive PSAs would be selected to be correspondingly lower.

Thus, one aspect of this invention relates to a coated sheet material comprising a flexible sheet and a vinyl-siloxane block copolymer release coating covering at least a portion of one major surface of the flexible sheet, wherein the release level for a given pressure sensitive adhesive can be systematically changed from a tight low adhesion backsize level (15 to 30 N/dm) to a premium release liner level (0.2 to 0.6 N/dm) by variation in the amount and molecular weight of siloxane polymeric block present. This, coupled with utility for a variety of pressure sensitive adhesive types, allows for the use of this invention in satisfying a wide range of application needs.

A further aspect of this invention is that certain of these release coatings can be coated as waterborne materials, eliminating the environmental concerns, flammability, and costs usually associated with solvent-borne coatings of low adhesion backsizes and release materials. Vinyl-siloxane block copolymers suitable for waterborne application are either those containing ionic functionalities in the vinyl polymeric block, or those containing acidic or basic functionalities which on neutralization yield ionic functionality.

Another important feature of this invention is that certain of the release coatings are receptive to water and oil based pen inks.

DETAILED DESCRIPTION OF THE INVENTION

The block copolymers comprising the release coating of the coated sheet material have a well-defined structure. When such copolymers are coated on a substrate, the siloxane block presents a low energy, "siliconized" release surface, and the higher energy vinyl polymeric block or blocks provide adhesion to the substrate. The chemical nature or composition of the vinyl polymeric block or blocks can be modified independent of the release aspect, to improve adhesion to the substrate, to allow for water dispersability, to impart ink receptivity, etc., without any serious perturbation of the surface characteristics of the film. The release properties of the coating are determined by both the siloxane content (weight percentage) of the block copolymer and the molecular weight of the siloxane block, with higher siloxane content and/or molecular weight providing easier release. A block copolymer or copolymer blend can, therefore, be chemically tailored to provide a specific level of release which can be reproduced with consistency, thus making possible the variation of the release properties of a coated sheet material over a range of values in a controlled fashion. Thus, by virtue of their chemical composition and structure and the resultant properties, the copolymers are uniquely well-suited to controlled release coating applications.

As indicated above, T and X are organic groups selected so that the T—X bond is capable of dissociating upon being subjected to an appropriate energy source to form free radicals.

Useful organic groups T include but are not limited to xanthates and dithiocarbamates.

Examples of xanthates useful as the organic group T include xanthates of the formula:

wherein $R_{12}$ is a monovalent moiety selected from the group consisting of $C_{1-4}$ alkyl, aryl and substituted aryl.

Preferably, the organic group T is

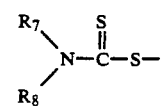

wherein $R_7$ and $R_8$ are monovalent moieties selected from the group consisting of hydrogen, $C_{1-4}$ alkyl, aryl and substituted aryl, $R_7$ and $R_8$ being the same or different and being selected so as that they will not prevent the initiator radical from initiating free radical polymerization or the combining of said terminator free radical with the initiator free radical or a polymer free radical segment including said initiator free radical. Preferably, $R_7$ and $R_8$ are ethyl radicals for reasons of commercial availability.

A primary function of X is its ability to provide an initiator free radical upon dissociation. A secondary function of X is its ability to provide hydrolytic stability to the iniferter since a T—Si bond would be easily hydrolyzed. Preferably, X is a divalent radical selected from the group consisting of alkylene, arylalkylene and arylene.

X can also preferably comprise a divalent species having the general formula

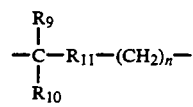

wherein $R_9$ and $R_{10}$ can be the same or different and are selected from the group consisting of hydrogen and $C_{1-6}$ alkyl, $R_{11}$ is a divalent radical selected from the group consisting of $C_{1-7}$ alkylene and phenylene, and n is an integer of at least 1.

X can also preferably comprise

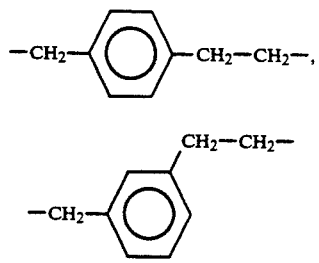

and mixtures thereof.

Most preferably X is selected from the group consisting of

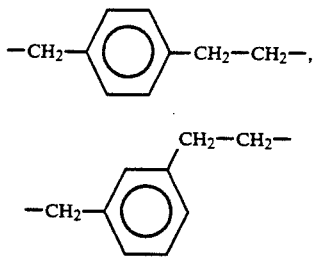

and mixtures thereof for reasons of commercial availability and ease of synthesis of the siloxane iniferter compound.

As indicated above Y is selected from the group consisting of —X—T and —Z wherein —X—T and —Z are as defined above. If Y is selected to be —X—T, a "macro" siloxane diiniferter is formed which can be used in preparing ABA, CABAC, etc., vinyl-siloxane block copolymers. If Y is selected to be —Z, a "macro" siloxane monoiniferter is formed which can be used in preparing AB, CAB, etc., vinyl siloxane block copolymers.

Z has been defined as an organic moiety that will not dissociate to form free radicals when subjected to an energy source. Preferably, Z is selected from the group consisting of alkyl, alkoxy, alkyl-amino, aryl, hydroxy, and fluoroalkyl.

As indicated above, m should be an integer of at least 10 in order that the block copolymer formed using the siloxane iniferter compound contains a siloxane segment of sufficient size to impart some of the properties of the siloxane segment to the block copolymer. Preferably, however, m is an integer ranging from about 10 to about 200 in order to provide a block copolymer having release characteristics with a broad range of capabilities.

The block copolymers comprising the release coatings of the invention are typically AB and ABA type copolymers. Block copolymers of the invention can also have CAB, CABAC, etc. architectures.

The preferred weight ratio of vinyl polymer block to siloxane polymer block in the copolymer ranges from about 98:2 to 40:60, in order to allow for a wide range of release performance while still maintaining good film forming properties.

The requirement that the $T_g$ or $T_m$ of the vinyl polymeric block or blocks A be above about $-20°$ C. is to insure that the coating is non-tacky.

The preferred copolymers are those wherein A comprises at least one polymer block comprising polymerized free radically polymerizable monomer selected from the group consisting of styrene, methyl methacrylate, methyl acrylate, acrylic acid, acrylonitrile, isobornyl methacrylate, N-vinyl pyrrolidone, butyl methacrylate, isopropyl methacrylate, isobornyl acrylate, vinyl acetate, hydroxy propyl acrylate, hydroxy ethyl acrylate, N-methyl perfluorooctane sulfonamido ethyl acrylate, N-ethyl perfluorooctane sulfonamido ethyl acrylate and mixtures thereof.

Most preferably, A comprises a copolymer block consisting essentially of methyl acrylate and acrylic acid.

A, which is defined above, can comprise at least one homopolymer block, copolymer block or multiblock copolymer. Preferably, A comprises at least one copolymer block for reasons of imparting better adhesion, water dispersability, and ink receptivity. A can also comprise a multiblock copolymer wherein at least one block of said multiblock copolymer is a homopolymer.

The selection of the composition of A is typically based upon the intended use of the release coating and the properties the release coating must possess in order to accomplish its intended purpose. If A comprises one polymeric block formed from one free radically polymerizable monomer charge, the polymer will have AB or ABA architecture depending upon whether a siloxane monoiniferter compound or siloxane diiniferter compound is used, respectively. The monomer charge can comprise one or more different types of free radically polymerizable monomer. For example, in the preparation of a polymer having AB or ABA architecture, the monomer charge may comprise a mixture of methyl acrylate and acrylic acid in order to form polymers of the formula MA/AA-b-PDMS and MA/AA-b-PDMS-b-MA/AA, respectively.

A can comprise two or more polymer blocks formed from two or more separate monomer charges, respectively. Each monomer charge can comprise one or more different types of free radically polymerizable monomer. For example, A can comprise polymer block A', which consists essentially of a polymerized free radically polymerizable first monomer charge and polymer block A'' which consists essentially of a polymerized free radically polymerizable second monomer charge. When A comprises two blocks, the polymer will have CAB or CABAC architecture depending upon whether a siloxane monoiniferter compound or siloxane diiniferter compound is used, respectively.

The release coatings may comprise the defined copolymer alone, or may comprise such copolymers blended with a compatible homopolymer, copolymer, etc. The low percentage of siloxane block contained in the block copolymers makes the block copolymers readily compatible with polymers of similar composition to the vinyl polymeric blocks. In addition, there are several pairs of dissimilar polymers that yield compatible blends due to specific interaction as described by S. Krause in Polymer Blends, Academic Press, New York, 1978. Introduction of a low level of siloxane block onto one of these polymers will not influence compatibility.

Fillers or pigments (e.g., alumina, silica, titania, or calcium carbonate) may, of course, be added to the copolymer compositions to reduce gloss and also impart a surface texture that is more receptive to marking with pencils and roller ball pens.

The preferred method of preparation of the release compositions of the coated sheet material of the invention provides block copolymers of high purity which can be coated directly from the polymerization solvent. The resultant coatings do not require curing or crosslinking. However, if solvent resistance is desired for a particular application, crosslinking can be effected by standard methods well-known in the art, such as radiation curing (electron beam or ultraviolet light) or chemical crosslinking. Since siloxane constitutes only a portion of the coating (even at high levels of release suitable for release liner applications), these copolymer compositions provide a potential cost savings over conventional 100% silicone release compositions and numerous blends.

The siloxane iniferter compounds used in synthesizing the block copolymers are "macro" iniferters capable of predictably inserting polymerized siloxane segments into a vinyl block copolymer backbone of the AB or ABA type of polymer architecture by a controllable process which permits the siloxane functionality and the vinyl functionality to be balanced to meet the performance requirements of the block copolymer. It is possible using the siloxane iniferter compound to vary both the molecular weight and weight percent of silicone midblock present as well as the molecular weight and composition of the end blocks. Thus, various properties of the AB and ABA blocks can be tailored depending upon the intended end use of each particular copolymer. In addition, it is possible to go beyond the simple AB and ABA architecture to more complicated copolymer structures, such as CAB and CABAC, which is not possible when using non-iniferter polymerization techniques.

BEST MODE FOR CARRYING OUT THE INVENTION

I. Preparation of Siloxane Iniferter Compound

The siloxane iniferter compound used in preparing the block copolymer of the release coating is referred to as a "macro" iniferter due to the inclusion of the polymerized siloxane segment. The macro siloxane iniferter compound can be prepared as follows.

I(a) Synthesis of End Blocker

The first step in the preparation of the macro siloxane iniferter compound is the synthesis of the endblocker, which is used in the preparation of the polymerized siloxane segment. The synthesis of the endblocker can be represented by the following general formula:

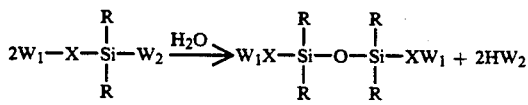

wherein
$W_1$ is selected from the group consisting of Cl, Br, and tosylate,
$W_2$ is selected from the group consisting of Cl, Br, and alkoxy,
R can be any combination of $R_1$, $R_2$, $R_5$ or $R_6$, as previously defined, and
X is as previously defined.

The above reaction can be carried out in any suitable corrosion resistant vessel such as glass or stainless steel.

The above reaction is exothermic and is preferably carried out at room temperature.

The end blocker should be capable of controlling the molecular weight of the polymerized siloxane segment. In addition, the end blocker should be capable of reacting with a nucleophile such as sodium diethyldithiocarbamate in a suitable organic solvent under mild conditions to yield the siloxane iniferter compound.

I(b) Polymerization of Siloxane Monomers to Form Siloxane Precursor Compound The second step in the preparation of the "macro" siloxane iniferter compound is the polymerization of an organocyclosiloxane monomer by use of the end blocker in order to form a "siloxane precursor" compound also referred to herein as a "polymerized siloxane segment". An example of a suitable organocylosiloxane monomer is hexamethylcyclotrisiloxane, "$D_3$". The selection of the endblocker is important since it caps one or both ends of the polymerized siloxane segment depending upon whether a difunctional or monofunctional iniferter is formed, respectively.

I(b)(1) Preparation of Siloxane Precursor Compound to Siloxane Monoiniferter Compound The preparation of the siloxane precursor compound to the siloxane monoiniferter compound useful in forming AB, CAB, etc. block copolymers is accomplished by anionic polymerization of cyclic siloxanes having a strained ring structure.

Suitable monomers for use in the above-mentioned anionic polymerization are, in general, diorganocyclosiloxanes of the formula

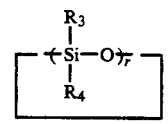

wherein $R_3$ and $R_4$ are as previously defined and wherein r is an integer of 3. The preferred monomer is the cyclic siloxane wherein r is an integer of 3 and $R_3$ and $R_4$ are both methyl groups, designated as hexamethylcyclotrisiloxane, "$D_3$".

Initiators of the anionic polymerization reaction are chosen such that redistribution reactions are much slower than chain growth, thus monofunctional living polymer is produced. Suitable initiators include but are not limited to alkyl or aryl lithium compounds containing up to 20 carbon atoms in the alkyl or aryl radical or more, preferably up to 8 carbon atoms. Examples of such compounds include methyl lithium, ethyl lithium, n-butyl lithium, sec-butyl lithium, tert-butyl lithium, phenyl lithium, and 2-ethylhexyl lithium. Examples of additional useful initiators include but are not limited to lithium alkoxides, hydroxides, and amides, as well as triorganosilanolates of the formula

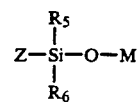

wherein
M is a lithium or benzyltrimethylammonium bis(o-phenylenedioxy)-phenyl cation, the latter cation requiring a coactivator such as water or alcohol, and Z, $R_5$, and $R_6$ are as previously defined.

The above compounds are described by C. L. Lee and O. K. Johannson, J. Polym. Sci., Polym. Chem., 14, 729 (1976), incorporated by reference herein.

The preferred triorganosilanolate initiator is lithium trimethylsilanolate (LTMS) or butyldimethylsilanolate. Preferably, the reaction components comprise both strained cyclic monomer and lithium initiator, thus reducing the likelihood of redistribution reactions and thereby providing siloxane precursor having a narrow molecular weight distribution which is reasonably free of unwanted cyclic oligomers and nonfunctional or difunctional polymers.

For the initiation of the anionic polymerization, an inert, preferably polar, organic solvent can be utilized. Anionic polymerization propagation with a lithium counterion requires either a strong polar solvent such as tetrahydrofuran (THF), dimethyl sulfoxide, or hexamethylphosphorous triamide, or a mixture of such a strong polar solvent with a nonpolar aliphatic, cycloaliphatic, or aromatic hydrocarbon solvent such as hexane, heptane, octane, cyclohexane, or toluene. The polar solvent allows the initiator to dissociate, thus "activating" the initiator and making propagation possible. If a nonpolar solvent is utilized, the initiator, such as lithium trimethylsilanolate, will not dissociate and hence will not be "activated".

Generally, the polymerization can be carried out at a temperature ranging from about $-20°$ C. to about $100°$ C., preferably from about $-10°$ C. to about $50°$ C. Anhydrous conditions and an inert atmosphere such as nitrogen, helium, or argon are required. Termination of the anionic polymerization is, in general, achieved via direct reaction of the living polymeric anion with halogen-containing terminating agents, i.e., functionalized halosilanes of the formula

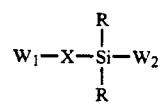

wherein $W_1$, $W_2$, and R are as previously defined.

I(b)(2) Preparation of Siloxane Precursor Compound to Siloxane Diiniferter Compound The preparation of the siloxane precursor compound for use in preparation of the siloxane iniferter compound involves an acid or base catalyzed equilibration reaction of diorganocyclosiloxanes having the general formula

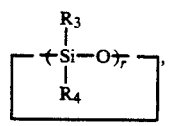

wherein $R_3$, $R_4$, and r are as previously defined, with an end blocker having the general formula

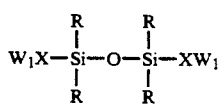

wherein $W_1$, X, and R are as previously defined.

Octamethylcyclotetrasiloxane, "$D_4$", is especially preferred for the acid or base equilibration reaction due to its commercial availability. Examples of proton acids useful as catalysts include sulfuric acid, ethane sulfonic acid, trifluoromethane sulfonic acid, selenic acid, nitric acid, phosphoric acids, pyrophosphoric acid, and boric acid. An example of a useful carboxylic acid catalyst is trifluoroacetic acid. Lewis acid catalysts useful for polymerization are iron (III) chloride, boron trifluoride, zinc chloride, tin (IV) chloride, etc. Bases useful as catalysts include alkali-metal hydroxides, alkali-metal silanolates, alkali-metal alkoxides, quaternary ammonium hydroxides, tetramethylammonium silanolate, tetrabutylphosphonium silanolate, etc.

Generally, the polymerization can be carried out at a temperature ranging from about $25°$ C. to about $90°$ C., preferably from about $75°$ C. to about $90°$ C.

The selection of an endblocker which will cooperate with the siloxane midblock segment to accomplish the desired overall performance of the block copolymer is important and must be made in a way which will not diminish the effectiveness of the siloxane segment. The end blocks of the siloxane moiety should be able to react with soft nucleophiles such as sodium diethyldithiocarbamate for further reaction in order to synthesize vinylsiloxane copolymers.

I(c) Placement of the Photoiniferter on the Siloxane Precursor

The third step involved in the preparation of the "macro" siloxane iniferter compound is the placement of a photoiniferter on the siloxane precursor, also referred to herein as the "polymerized siloxane segment". The following general reaction demonstrates the placement of a photoiniferter on the polymerized siloxane segment.

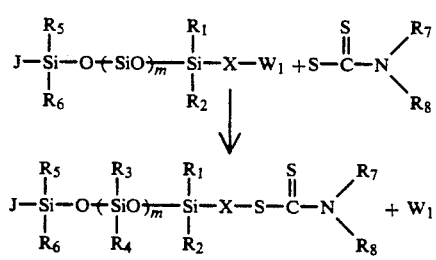

wherein $R_1$, $R_2$, $R_3$, $R_4$, $R_5$, $R_6$, $R_7$, $R_8$, $W_1$, and, X are as previously defined and J is selected from the group consisting of —Z and —X—W.

The incorporation of a photoiniferter on the polymerized siloxane segment involves the reaction of a mono or difunctional siloxane segment with a nucleophile in the presence of a polar organic solvent. Mono or difunctional siloxane segments can be represented by the general formula

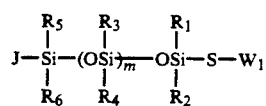

wherein $W_1$, X, $R_1$, $R_2$, $R_3$, $R_4$, $R_5$, $R_6$, J, and m are as previously defined.

Preferably, $R_1$, $R_2$, $R_3$, $R_4$, $R_5$, and $R_6$ are methyl groups and W is a chloro group for reasons of commercial availability.

Useful nucleophiles include, but are not limited to, dithiocarbamates of the general formula

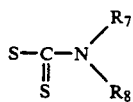

wherein $R_7$ and $R_8$ are as previously defined. Preferably, $R_7$ and $R_8$ are ethyl groups for reasons of commercial availability.

The reaction involving the incorporation of a photoiniferter on the polymerized siloxane segment requires a polar organic solvent such as tetrahydrofuran, chloroform, dimethylsulfoxide or dimethylformamide. The polar solvent is utilized to dissolve the reaction components in order for the reaction to proceed.

Generally, the reaction is carried out at a temperature ranging from about 20° C. to about 45° C., preferably from about 20° C. to about 30° C.

II. Preparation of Siloxane Block Copolymer

The copolymerization of the free radically polymerizable monomer and the polymerized siloxane segment to produce the block copolymer useful as a release coating is by step-wise free radical polymerization. The free radically polymerizable monomer is dissolved in a suitable inert solvent, if needed, and polymerized by free radical polymerization utilizing the siloxane iniferter compound as a free radical initiator source. A siloxane monoiniferter compound is used to form block copolymers having AB, CAB, etc., architecture. A siloxane diiniferter compound is used to form block copolymers having ABA, CABAC, etc., architecture. Generally, the weight ratio of the siloxane iniferter compound to the free radically polymerizable monomer ranges from about 2:98 to about 60:40, respectively. Preferably, the weight ratio of the siloxane iniferter compound to the free radically polymerizable monomer ranges from about 20:80 to about 50:50, respectively. Generally from about 0.01 to about 5 percent by weight of the T group of the siloxane iniferter compound is present based upon the total weight of the free radically polymerizable monomer.

The siloxane iniferter compound is caused to dissociate to form free radicals by exposure to an appropriate energy source, preferably, a radiant energy source, most preferably, an ultraviolet radiant energy source. Upon exposure to the energy source, the iniferter which is defined above and represented by the general formula

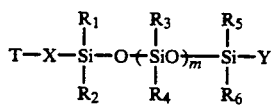

dissociates to form a terminator free radical of the formula T. and an initiator free radical of the formula

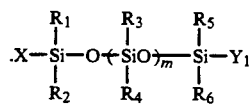

wherein $R_1$, $R_2$, $R_3$, $R_4$, $R_5$, $R_6$, T, X, Y, $Y_1$ and m are as previously defined.

The particular energy source and its intensity are selected to result in the dissociation of the iniferter to free radicals. The intensity and rate of irradiation are chosen to advance the polymerization at a reasonable rate without deleteriously affecting the polymer segment being produced. An ultraviolet light source having a wavelength on the order of 300 to 400 nm spaced approximately 10 cm from the reactants to provide an exposure of 2 mW per square centimeter has been found to produce suitable results. Reaction times on the order of 2 to 50 hours have been found to be typical, depending upon the intensity of the radiation, with faster reaction times being observed at greater intensities.

It should be understood that minor amounts of the monomer forming the A block or blocks may be present as a homopolymer in the copolymer composition. Such minor amounts of homopolymer may be produced in an unwanted side reaction during polymerization of the copolymer. Such amounts will typically be less than 5 parts by weight of all the homopolymer based upon 100 parts by weight of the copolymer.

The reactants and any solvent employed are charged into an energy source-transparent vessel and therein subjected to the energy source. If the energy source is ultraviolet light radiation, a suitable ultraviolet light-transparent vessel is utilized.

The reaction is preferably conducted in a vessel with agitation to permit uniform exposure of the reactants to the energy source. While most of the reactions have been conducted by employing a batch process, it is possible to utilize the same technology in a continuous polymerization operation.

The reaction mixture may include a suitable inert solvent but it is not necessary since many of the monomeric materials are liquid themselves and may thus be charged into the reaction vessel without utilization of a solvent.

The solvent, if utilized in the free radical polymerization, may be any substance which is liquid in a temperature range of about −10° C. to about 50° C., is substantially transparent to the energy source employed to permit dissociation of the iniferter to form free radicals, is inert to the reactants and product, and will not otherwise adversely affect the reaction. Examples of suitable solvents include but are not limited to water, ketones such as methyl ethyl ketone, alkyl acetates such as ethyl acetate, alkanes such as hexane and heptane, alcohols such as methanol and ethanol, aromatic hydrocarbons such as toluene and benzene, and mixtures of two or more of these. Other solvent systems are useful. The amount of solvent is generally about 30 to 80 percent by weight based on the total weight of the reactants and solvent. In addition to solution polymerization herein described, the copolymerization may be carried out by other well known techniques such as suspension, emulsion and bulk polymerization.

The method of making the block copolymer useful as a release coating comprises:
  a) mixing
    (1) an iniferter represented by the general formula

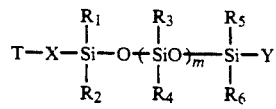

wherein

T and X are organic groups selected so that the T—X bond is capable of dissociating upon being subjected to an appropriate energy source to form a terminator free radical of the formula T. and an initiator free radical of the formula

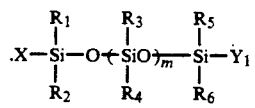

the initiator free radical being sufficiently reactive to initiate free radical polymerization of free radically polymerizable monomer and the terminator free radical being insufficiently capable of initiating free radical polymerization of free radically polymerizable monomer but capable of rejoining with the initiator free radical or a free radical polymer segment free radically polymerized with the initiator free radical;

$R_1$, $R_2$, $R_5$, and $R_6$ are monovalent moieties selected from the group consisting of hydrogen, $C_{1-4}$ alkyl, $C_{1-4}$ alkoxy and aryl which can be the same or are different;

$R_3$ and $R_4$ are monovalent moieties which can be the same or different selected from the group consisting of $C_{1-4}$ alkyl, $C_{1-4}$ fluoroalkyl including at least one fluorine atom and aryl;

$R_1$, $R_2$, $R_3$, $R_4$, $R_5$, and $R_6$ are selected so that they do not prevent the initiator free radical from initiating free radical polymerization or the combining of the terminator free radical with the initiator free radical or a polymer free radical segment including the initiator free radical;

Y is selected from the group consisting of —X—T and —Z wherein X and T are defined above and Z is an organic moiety that will not dissociate to form free radicals when subjected to the energy source;

$Y_1$ is selected from the group consisting of —X. and Z; and m is an integer of 10 or greater; and (2) a monomer charge comprising monomer which is free radically polymerizable; and (b) exposing the mixture of (a) to an energy source capable of forming free radicals T. and

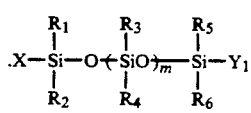

(c) maintaining the exposure of (b) until the free radically polymerizable monomer polymerizes with the radical

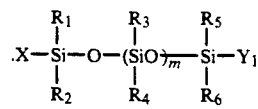

to form a free radical block copolymer segment represented by the formula

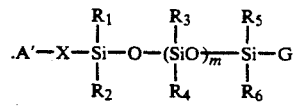

wherein

A' represents a polymer block consisting essentially of polymerized free radically polymerizable monomer;

G is selected from the group consisting of —X—'. and —Z; and (d) terminating the exposure of (b) whereby

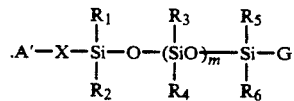

and T. combine to from a block copolymer represented by the formula

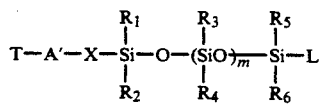

wherein

L is selected from the group consisting of —X—A'—T and —Z, wherein X, A', T, and Z are defined above or alternatively maintaining the exposure of

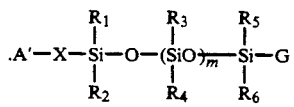

and T. to said energy source;

(e) optionally mixing

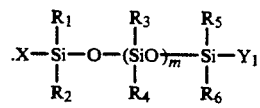

or mixing

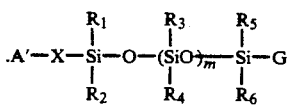

and T. with a second monomer charge consisting essentially of free radically polymerizable monomer in order to form a second mixture;

(f) exposing the mixture of

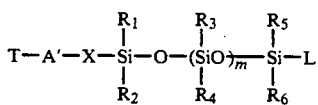

and said second monomer change to an energy source capable of forming free radical T. and

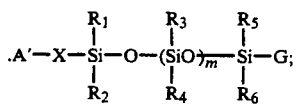

or alternatively maintaining the exposure of T. and

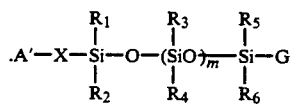

which is mixed with said second monomer charge, to said energy source;

(g) maintaining the exposure of (f) until the free radically polymerizable monomer polymerizes with the free radical

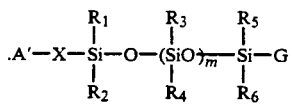

to form a free radical block copolymer segment represented by the formula

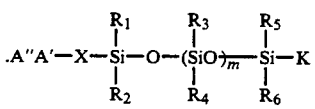

wherein

A" represents a polymer block consisting essentially of polymerized free radically polymerizable second monomer;

K is selected from the group consisting of —X—A'—A". and —Z; and (h) terminating the exposure of (f) whereby

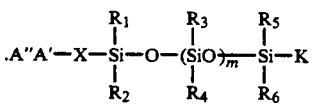

and T. combine to form a block copolymer represented by the formula

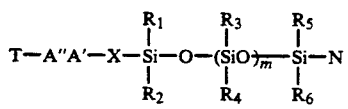

wherein N is selected from the group consisting of —X—A'A"T and —Z.

The above method describes the preparation of AB, ABA, CAB, and CABAC block copolymers.

In order to form a block copolymer having AB architecture, a monoiniferter compound is used in conjunction with a first monomer charge only. In order to form a block copolymer having ABA architecture, a diiniferter compound is used in conjunction with a first monomer charge only.

In order to form CAB and CABAC block copolymers both the first monomer charge and second monomer charge are used. In order to form a block copolymer having CAB architecture a monoiniferter compound is used in conjunction with the first monomer charge and a second monomer charge. In order to form a block copolymer having CABAC architecture a diiniferter compound is used in conjunction with a first monomer charge and a second monomer charge.

As indicated above, in forming block copolymers having more complicated architecture such as CAB and CABAC the exposure can be terminated in step (d) and a second monomer charge can be added, or alternatively the exposure can be maintained during the addition of the second monomer charge.

The decision whether to terminate exposure typically depends on the type of equipment used to carry out the polymerization. If a sealed vessel is used as in the Examples, exposure will be terminated while the sealed vessel is opened and the second monomer charge is added to the reaction vessel, which is then resealed. However, if a continuous polymerization procedure is utilized it is not necessary to terminate the exposure to the energy source in order to add the second monomer charge.

More complex architecture such as DCABACD, etc., or DCAB, etc., can be obtained by adding additional monomer charges to the reaction vessel and following the procedure described above.

The block copolymers useful as release coating of the present invention may, when necessary or desirable, be blended with a compatible modifier in order to optimize physical properties. The use of such modifiers is common in the art. For example, it may be desirable to include such materials as pigments, fillers, stabilizers, or various polymeric additives.

It should be noted that, while the block copolymers of the present invention have improved toughness without subsequent cross-linking, if necessary, further solvent resistance and resistance to photochemical or oxidative forces may be obtained by cross-linking by employing radiant energy or chemical procedures.

The release copolymers defined above are best used as a coating for a solid substrate, which may be a sheet, fiber, or shaped object. However, the preferred substrates are flexible substrates such as those used for pressure-sensitive adhesive products. Suitable substrates include paper, coated paper such as a polymeric coated or saturated paper (e.g. polyethylene coated kraft paper), metal sheets and foils, non-woven fabrics, and films of thermoplastic resins such as polyesters, polyamides, polyolefins, polycarbonates, polyvinyl chloride, etc., although any surface requiring release toward adhesives can be used. Primers known in the art can be utilized to aid in adhesion of the coating to the substrate, but they are not generally necessary.

The release coating compositions may be applied to suitable substrates by means of conventional coating techniques such as wire-wound rod, direct gravure, offset gravure, reverse roll, air-knife, and trailing blade coating; hot melt coating is also possible. The resultant coatings provide effective release for a wide variety of conventional pressure-sensitive adhesives such as natural rubber-based, acrylic, and other synthetic film-forming elastomeric materials.

The release coatings and LABs of the coated sheet materials are typically applied at about 0.2 to about 2.0 g/m² depending upon the nature of the flexible substrate and the intended application of the coated sheet material.

The present invention provides a roll of tape which includes a flexible backing member, a pressure-sensitive adhesive coating one major surface of the backing member, and a release coating on the opposite major surface of the backing comprising the polymer defined above. The invention further provides a tape comprising a flexible backing member, a pressure-sensitive adhesive coating one major surface of the backing member and a release liner comprising a flexible sheet coated over the major surface adhered to the pressure-sensitive coating with the copolymer defined above. The invention further provides a transfer tape comprising a film of pressure-sensitive adhesive between two release liners, at least one being coated with the copolymer.

The invention also provides a coated sheet material wherein the release agent is on one side of the sheet and the adhesive is on the other side. The invention further provides a coated sheet material wherein the adhesive is a normally tacky and pressure-sensitive adhesive. The invention also provides a stack of superimposed sheets of the coated sheet material, the pressure-sensitive adhesive on each sheet being in contact with the release agent on an immediately adjacent sheet.

The invention also provides a fanfolded web formed from the coated sheet material, the adhesive on each segment of the web being in contact with the release agent on an immediately adjacent segment. The invention also provides the coated sheet material wherein the adhesive is present in a band adjacent one edge of the sheet. The invention also provides a stack of individual sheets formed from the coated sheet material, the adhesive bands of adjacent sheets lying along opposite edges.

The invention further provides a coated sheet material having a release agent on one side and an adhesive on the other side wherein said coated sheet material can be wound convolutely on itself about a core to form a roll. The invention further provides the coated sheet material wherein the adhesive is a normally tacky pressure-sensitive adhesive.

The invention further provides a coated sheet material wherein the release agent covers a first portion of one side and a normal tacky and pressure-sensitive adhesive covers a second portion of the same side. The invention further provides a coated sheet material wherein the sheet is an elongate strip having spaced alternating areas of release agent and an adhesive. The invention also further provides the coated sheet material wherein the sheet is generally rectangular, the release agent being present in a band adjacent one edge and the pressure-sensitive adhesive being present in a band adjacent the opposite edge.

III. Preparation of Water Dispersions of the Vinyl-Siloxane Block Copolymers A further aspect of this invention is that certain of these release coatings can be coated as waterborne materials, eliminating the environmental concerns, flammability, and costs usually associated with solventborne coatings of low adhesion backsizes and release materials.

Vinyl-siloxane block copolymers suitable for waterborne application are either those containing ionic functionalities in the vinyl polymeric block or those containing acidic or basic functionalities which on neutralization yield ionic functionality.

Certain of the vinyl-siloxane block copolymers comprising the release coatings of the coated substrates of the present invention can be modified to obtain a water dispersable formulation by a neutralization technique, specifically those copolymers containing acidic or basic functionality in the vinyl block.

Block copolymers containing acidic functionality are obtained by copolymerizing acidic monomers into the vinyl block. Suitable acidic monomers include those containing carboxylic acid functionality such as acrylic acid, methacrylic acid, itaconic acid, etc.; those containing sulfonic acid functionality such as 2-sulfoethyl methacrylate; and those containing phosphonic acid functionality.

Block copolymers containing basic functionality are obtained by copolymerizing basic monomers into the vinyl block Suitable basic monomers include those containing amine functionality such as vinyl pyridine, N,N-diethylaminoethyl methacrylate, N,N-dimethylaminoethyl methacrylate, N,N-dimethylaminoethyl acrylate, and N-t-butylaminoethyl methacrylate.

Preferred acidic monomers include acrylic acid and methacrylic acid. Preferred basic monomers include N,N-dimethylaminoethyl methacrylate and N,N-dimethylaminoethyl acrylate.

In order to achieve water compatibility or dispersibility, a certain minimum ionic content in the copolymer is required. The exact amount varies with the particular polymer formulation, the molecular weight of the polymerized siloxane segment, and other features of the individual copolymer. However, the addition of ionic groups, while increasing water miscibility, can negatively affect polymer properties, in particular the stability of the release performance under condtions of high humidity. It is therefore preferred that the ionic content either be kept to the minimum amount required to yield stable aqueous dispersions while maintaining other desirable properties, or that the ionic content introduced to achieve water dispersibility be non-permanent in nature As described below, this non-permanence is achieved by using a volatile weak acid or base in the neutralization technique which allows the polymer to revert to its original state on coating and drying. The introduction of such non-permanent ionic groups is most preferred. Generally a minimum of about 2% by weight of ionic content will yield a stable dispersion, considering the weight of the ionic group to include only the simplest of constructions, e.g., the monomer from which the ionic group is derived plus the base or acid used to neutralize it, as the molecular weight of the ion. Preferred copolymers incorporate above about 4% ionic content. Copolymers with permanent ionic content of over about 15% are too hydrophilic for use in most applications.

Preferably the block copolymer is prepared in a water-miscible solvent which has a boiling point below 100° C. such as acetone or methyl ethyl ketone. Alternatively, a non-water-miscible polymerization solvent such as ethyl acetate may be utilized. The non-water-miscible polymerization solvent may be removed from the block copolymer by using a rotary evaporator. The resulting solid block copolymer can then be dissolved in a water-miscible solvent such as those described above or mixtures including isopropanol, methanol, ethanol, tetrahydrofuran, etc.

The resulting solutions are added to an aqueous solution of a base, in the case of the acidic functional blocks, or an acid, in the case of the basic functional blocks. Suitable bases include ammonia and organic amines, such as triethyl amine, triethanol amine, methyl amine, morpholine, etc.; as well as metal hydroxides, oxides, carbonates, etc. Suitable acids include carboxylic acids such as acetic acid, as well as mineral acids, such as HCl.

In the case of a volatile weak base (e.g., ammonia) or aid (e.g., acetic acid) the ionic group formed (an ammonium carboxylate) is non-permanent in nature. For example, for an acrylic acid containing polymer neutralized with aqueous ammonia, the polymer remains as the ammonium acrylate derivative when dispersed in water, but is thought to revert to its original free acid state as the coating drys on the surface. This is because there is an equilibrium between the neutralized and free acid state as the coating drys on the surface. This is because there is an equilibrium between the neutralized and free acid which is shifted towards the free acid as the ammonium is driven off upon drying. This accounts for the similar performance observed for polymers coated as either solventborne or waterborne neutralized solutions. Acid or base in excess of an equivalent is preferably used to insure complete neutralization of the polymer and hence provide the best water dispersability, although this is not necessary in the majority of the cases.

For coating purposes, the polymer is diluted with water to less than about 10% solids. Agitation is sometimes necessary to yield a well dispersed polymer solution. The resulting dispersion may be used as prepared, or may be stripped of organic solvent by elevating temperature and/or reducing pressure. The removal of organic solvent is desirable when flammability or emissions are a concern. It is also beneficial in certain cases to add an organic solvent with a boiling point above about 100° C., such as 2-(2-butoxyethoxy)ethanol, 2-(2-hexoxyethoxy)ethanol, 2-(2-butoxyethoxy)ethyl acetate, furfuryl alcohol, N-methyl pyrrolidone, etc., in an amount up to about twice the amount of the block copolymer present. This results in improved release performance in some cases relative to the aqueous solution coated without this high boiling solvent. In addition, the presence of this additive may reduce foaming problems during stripping of the low boiling organic solvent from these dispersions.

Blends of these aqueous solutions with solutions of the same polymer in a low boiling water miscible organic solvent such as methylethyl ketone in all ratios are useful for obtaining slight adjustments in the release performance of a given polymer. This technique of tailoring release performance is presumably caused by the casting-solvent dependence of surface morphology. The effect of casting solvent on bulk morphology in hydrocarbon block polymers is discussed in Noshay and McGrath, Academic Press, New York, 1977, pp. 215 to 218, hereby incorporated by reference.

IV. Ink Receptive Block Copolymers

Certain of the release coatings of the coated sheet materials of the present invention are receptive to water and oil based pen inks.

Release coatings for pressure sensitive labels and tapes typically obtain their adhesive qualities from or fluorocarbon components. These low surface energy coatings thus tend to be hydrophobic, so although they are receptive to oil based pen inks, they cause dewetting of water based pen inks. This has made their use marginally acceptable in office and labeling applications, where there is typically a need to write on the release coated side of a label or tape.

In the label area, the larger substrate area involved necessitates near-premium release properties for a release coating. The lack of acceptable ink-receptive release coatings has lead to constructions involving a release liner which is stripped and discarded in use. A more economical and aesthetically pleasing embodiment would involve stacks or pads of adhesive coated sheets wherein the adhesive on the back of one sheet is in contact with the ink-receptive release coating on the face of the next sheet.

Mertens, et al, copending U.S. application Ser. No. 07/278,283, filed Nov. 20, 1988, (assigned to the assignee of the present case) hereby incorporated by reference, has described a non-iniferter prepared release coating which overcomes the need to use a release liner. Mertens discusses the nature of the vinyl polymeric segment required to impart ink receptivity to a release agent having at least one vinyl polymeric segment and at least one siloxane segment. According to Mertens the vinyl polymeric segment should have a hydrated $T_g$ between $-15°$ C. and $+35°$ C., the temperature difference between hydrated $T_g$ and actual $T_g$ should be at least 20° C., and a coating of the release agent should have a receding contact angle with water of less than 25°. The application of these ranges set forth in Mertens to the iniferter prepared, vinyl-siloxane block copolymer release coating described herein results in iniferter prepared release coatings that are receptive to water and oil based pen inks.

EXAMPLES

The following detailed description includes exemplary preparations of siloxane iniferter compounds. In addition, the detailed description includes exemplary preparation of vinyl-siloxane block copolymers and flexible substrates coated therewith. All parts and percentages are by weight unless otherwise specified.

DEFINITION OF TERMS

The number average molecular weight ($\overline{M}_n$) and weight average molecular weight ($\overline{M}_w$) are well-known mathematical descriptions of the molecular weight distribution of a polymer sample.

The polydispersity, abbreviated p, is a measure of the molecular weight distribution of a polymer and is defined as $\overline{M}_w/\overline{M}_n$.

The glass transition temperature ($T_g$) is a well known temperature at which amorphous material changes from a glassy state to a ductile state.

The crystal melting temperature ($T_m$) is a well known temperature at which a crystalline polymer passes from a crystalline state to an amorphous state.

Each of the foregoing is a well-known term used by polymer chemists and others. Further explanation of the derivation of these terms may be found in J. F. Rabek's *Experimental Methods in Polymer Chemistry*, Wiley and Sons, 1981, Chapter 3 entitled "Molecular Weight Averages", pages 57-61.

The block copolymers which comprise the release coatings of the coated sheet materials of the present invention are described in a short-hand way depending upon the monomer forming each block. For example, MMA-b-PDMS-b-MMA refers to a copolymer having blocks ("b") of polymerized methyl methacrylate ("MMA") and a block of polymerized dimethyl siloxane ("PDMS"). For example, MMA-b-PDMS-b-MMA refers to an ABA block copolymer having two A (polymethyl methacrylate) end blocks and a single B midblock (polydimethyl siloxane).

AB block copolymers can also be described in this short-hand way. For example, MMA-b-PDMS refers to an AB block copolymer having one block of polymerized methyl methacrylate ("MMA") and one block of polymerized dimethyl siloxane ("PDMS").

TEST METHODS

The test methods used to evaluate the block copolymers of the examples are industry standard tests. The test methods which characterize the block copolymers are those which demonstrate its molecular architecture. The gel permeation chromatography (GPC), and differential scanning calorimetry (DSC) measurement results have been obtained. The standard tests are described in detail in various publications of the American Society for Testing and Materials (ASTM), Philadelphia, Pa. The standard test methods are described in detail below. The reference source of each of the standard test methods is also given.

GEL PERMEATION CHROMATOGRAPHY

The characterization of the molecular weight distribution of the polymers has been by conventional gel permeation chromatography (GPC).

A Hewlett-Packard Model 1084B, high performance liquid chromatograph equipped with Styragel ™ columns was used. The system was calibrated using polystyrene standards. All molecular weight averages are polystyrene equivalent molecular weights. The molecular weight averages and polydispersities were calculated according to accepted practices. GPC test methods are further explained in "Modern Size Exclusion Liquid Chromatography" *Practice of Gel Permeation Chromatography*, John Wiley and Sons, 1979.

DIFFERENTIAL SCANNING CALORIMETRY

One gram of the block copolymer of interest was dissolved in 1.5 grams of an appropriate organic solvent, cast into a 70 mm diameter aluminum dish and dried in an air forced oven at 105° C. for 30 minutes. A small amount of the resulting sample was placed in the DSC chamber of a Perkin-Elmer DSC-2 differential scanning calorimeter under nitrogen atmosphere. The sample was cooled from room temperature to −150° C. with liquid $H_2$ and then heated to 150° C. at 20° C. per minute. The $T_g$ was taken as the midpoint of the curve in the glass transition region.

A. SYNTHESIS OF "MACRO" SILOXANE DIINIFERTER COMPOUND

Examples 1-5 describe the synthesis of a "macro" siloxane diiniferter compound which can be used in the preparation of ABA, CABAC, etc. block copolymers.

The first step involved in the synthesis of a "macro" siloxane diiniferter compound is the synthesis of an end blocker. Example 1 below describes the synthesis of the end blocker, 1,3-bis(2-p,m-chloromethyl phenyl ethyl)-1,1,3,3-tetramethyl disiloxane (I).

Example 1

Synthesis of End Blocker, 1,3-Bis(2-p,m-chloromethyl phenyl ethyl) -1,1,3,3-tetramethyl disiloxane (I)

A 250 milliliter round-bottomed flask equipped with a stirrer and a drying tube, was charged with 0.147 moles of 1-(dimethylchlorosilyl)-2-(p,m-chloromethyl phenyl)ethane,

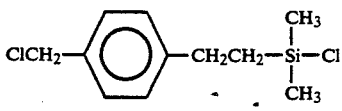

(available from Huls America, Inc., formerly Petrarch Systems), and an excess of water (5 grams). Although a mixture of para and meta compound was used, the reaction equations are drawn only showing the para compound in order to simplify the diagrams. The flask contents were stirred for about 3–4 hours. The resulting mixture was transferred to a separatory funnel. One hundred milliliters of ether and 100 milliliters of distilled water were added to the separatory funnel, after which the separatory funnel was shaken vigorously for a period of 30 seconds. The mixture contained in the separatory funnel was then left to stand for several minutes to allow a water layer and an ether layer to form. The water layer was then rejected from the separatory funnel. An additional 100 milliliters of distilled water was added to the remaining ether layer and the extraction process was repeated. Ether was evaporated from the remaining layer by use of a rotary evaporator. The end blocker (I) was obtained at a yield of 80-85 percent. The purity of the end blocker compound was evaluated by means of thin layer chromatography (silica) wherein $CHCl_3$ was used as the solvent.

The reaction of Example 1 can be represented as follows:

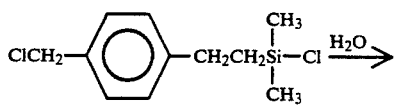

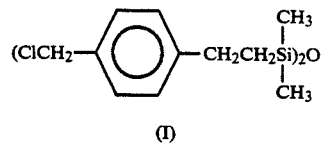

The second step involved in the synthesis of "macro" siloxane diiniferter compound is the synthesis of a siloxane precursor using an end blocker. Examples 2, 3 and 4 are representative of the synthesis of siloxane precursor II) by use of end blocker (I). Examples 2-4 below demonstrate the effects of the octamethylcyclotetrasiloxane "D4" to end blocker (I) ratio.

Examples 2-4

Synthesis Of Siloxane Precursor (II) Using End Blocker (I)

Example 2

Into a 1-liter 3-neck round bottom flask were charged 68 grams of octamethylcyclotetrasiloxane, referred to herein as "D4", 6.74 grams of end blocker (I) prepared according to Example 1, and 0.68 gram of Darco G60® carbon black available from EM® Science (a subsidiary of VWR Scientific). The reaction mixture was agitated for approximately 10 minutes until a uniform distribution of carbon black in the solution was achieved. Next, 0.06 gram of $H_2SO_4$, which acts as a catalyst, (roughly 0.08 percent of $H_2SO_4$) was added for the acid equilibration reaction.

The resulting mixture was heated at 90° C. for about 5 hours, dry nitrogen being purged throughout the reaction. The carbon black, on which $H_2SO_4$ was absorbed, was removed by filtering the mixture under $N_2$ pressure. Approximately 90 percent conversion was obtained. The 15 percent cyclics, the majority of which were $D_4$ followed by $D_5$ and $D_6$, etc. were stripped off using a water aspirator during which time the flask contents were held at 150° C.

Example 3

The procedure of Example 2 was repeated. The charges of "$D_4$", carbon black, concentrated $H_2SO_4$, and end blocker (I) were as follows: "$D_4$" (825 grams), carbon black (10 grams), concentrated $H_2SO_4$ (0.66 grams) and end blocker (I) (75 grams). This mixture was heated under the flow of dry nitrogen at 90° C. for about 8 hours. The 15 percent cyclics were stripped off using a water aspirator during which time the flask contents were held at 150° C.

Example 4

The procedure of Example 2 was repeated. The charges of "D ", carbon black, concentrated $H_2SO_4$, and end blocker (I) were as follows: "$D_4$" (136.0 grams), carbon black (2.0 grams), concentrated $H_2SO_4$ (0.11 grams), and end blocker I (2.0 grams). The mixture was heated under the flow of dry nitrogen at 90° C. for about 16 hours. The 15 percent cyclics were stripped off using a water aspirator during which time the flask contents were held at 150° C.

The reactions of Examples 2–4 can be represented as follows:

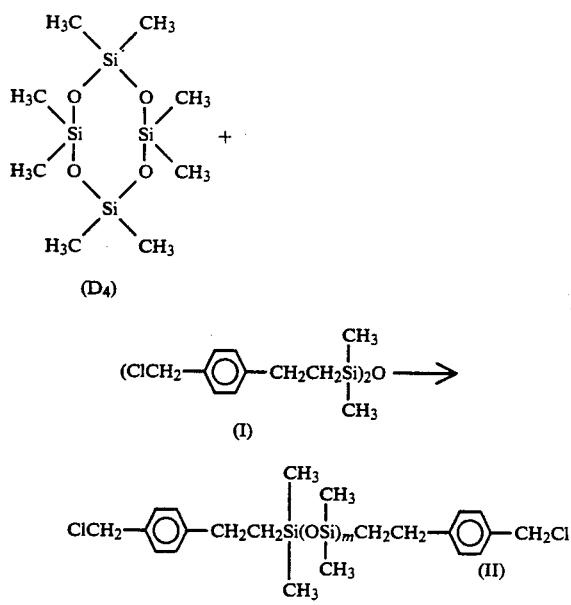

Table I below demonstrates the effects of octamethylcyclotetrasiloxane ($D_4$) to end blocker (I) ratio and the extent of heating at 90° C. on the molecular weight of siloxane precursor (II) formed.

TABLE I

| Example | Ratio of $D_4$ to End Blocker (I) | Mn | Mw | ρ |
|---|---|---|---|---|
| 2 | 10:1 | 2,520 | 6,130 | 2.430 |
| 3 | 11:1 | 3,797 | 6,997 | 1.842 |
| 4 | 68:1 | 30,195 | 54,421 | 1.802 |

The third step in the synthesis of "macro" siloxane diiniferter compound is the placement of a photoiniferter on the siloxane precursor (II). Example 5 sets forth the procedure utilized in synthesizing "macro" siloxane-diiniferter compound (III) using the siloxane precursor (II) of Example 3. The same procedure can be followed in synthesizing "macro" siloxane-diiniferter compounds (III) from the siloxane precursors (II) prepared according to Examples 2 and 4.

Example 5

Reaction Of Sodium Diethyl Dithiocarbamate Trihydrate, With Siloxane Precursor (II) To Form "Macro" Siloxane Diiniferter Compound (III)

Into a 1-liter vessel were charged 250 grams of tetrahydrofuran (THF), followed by 120 grams (0.04 mole) of the siloxane precursor (II) formed according to Example 2, and 20 grams (0.09 mole) of sodium diethyldithiocarbamate trihydrate. The vessel contents was stirred for about 4–5 hours at room temperature. Precipitation of sodium chloride was observed and tetrahydrofuran was evaporated off on a rotary evaporator. The resulting mixture was transferred to a separatory funnel. Three hundred grams of ether and 300 grams of distilled water were added to the separatory funnel. The separatory funnel was shaken vigorously and left to stand for several minutes to allow an ether layer and a water layer to form. The water layer was then rejected from the separatory funnel. An additional 300 grams of distilled water was added to the separatory funnel and the extraction process was repeated. This extraction process was repeated until the ether layer was cloud-free. The ether layer was dried over magnesium sulfate for about 2 hours. Finally, ether was evaporated off on a rotary evaporator in order to obtain "macro" siloxane-diiniferter compound (III). The reaction was monitored with proton NMR.

The reaction of Example 5 can be represented as follows:

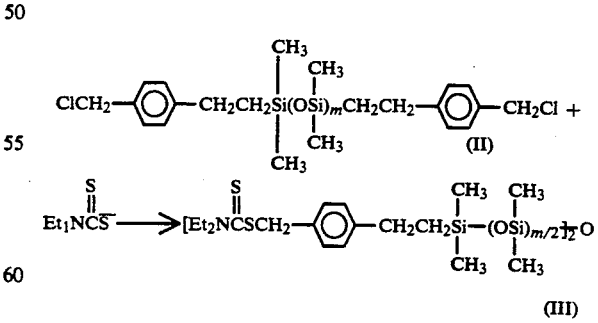

The "macro" siloxane-diiniferter compounds described above can be used in the synthesis of ABA block copolymers wherein A represents a vinyl segment of the block copolymer and B represents a siloxane midsegment. Examples 7–16 and 18–23 describe the synthesis of ABA block copolymers using the "macro"

siloxane diiniferter compound prepared according to Example 5. Example 17 describes the synthesis of a CABAC block copolymer using the "macro" siloxane diiniferter prepared according to Example 5. Example 24 describes the synthesis of an AB block copolymer using a "macro" siloxane monoiniferter compound prepared according to Example 6.

B. SYNTHESIS OF "MACRO" SILOXANE-MONOINIFERTER COMPOUND

Example 6 describes the synthesis of a "macro" siloxane-monoiniferter compound which can be used in the preparation of AB, CAB, etc. block copolymers.

Example 6

Synthesis Of "Macro" Siloxane Monoiniferter Compound

The first step in the synthesis of "macro" siloxane-monoiniferter compound was the synthesis of a macromolecular anion, lithium polydimethylsilanolate (IV), by anionic polymerization.

A 1-liter reaction vessel equipped with a stirring mechanism was charged with hexamethyl cyclotrisiloxane, referred to herein as "D$_3$", 91 grams, (0.41 mole), lithium trimethylsilanolate, Me$_3$SiOLi, 1.8 grams, (0.0186 mole) and 250 grams of tetrahydrofuran (THF) (30 percent solid). The vessel contents were stirred continuously at 0° C. for approximately 18 hours during which time the macromolecular anion, lithium polydimethylsilanolate (IV), was formed. The stirring was discontinued after almost all of the "D$_3$" was consumed. Gas chromatography was used to monitor the consumption of "D$_3$" in the reaction.

The reaction can be represented as follows:

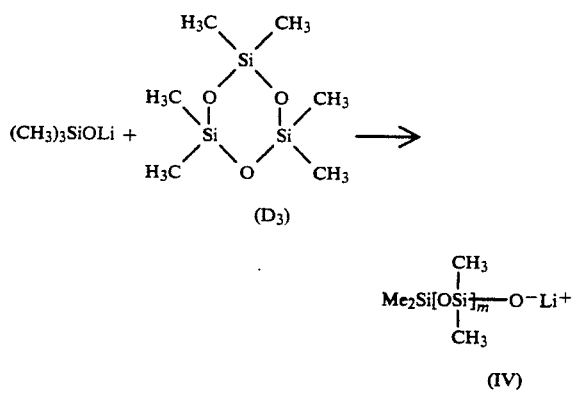

The next step involved the addition of 1-(dimethylchlorosilyl)-2-(p,m-chloromethylphenyl) ethane, ClCH$_2$C$_6$H$_4$CH$_2$CH$_2$SiCl(CH$_3$)$_2$, available from Huls America Inc., 18 grams, (0.04 mol) to the above solution, after which the resulting mixture was stirred for 2 hours at room temperature. Precipitation of lithium chloride was observed. The solution containing lithium chloride and unreacted 1-(Dimethylchlorosilyl)-2-(p,m-chloromethylphenyl)ethane in addition to siloxane precursor (V) was transferred to a separatory funnel. One hundred milliliters of CH$_3$OH was added to the separatory funnel, which was shaken vigorously. The separatory funnel containing the mixture was then left to stand for several minutes. The CH$_3$OH layer was then rejected from the separatory funnel. Tetrahydrofuran (THF) was evaporated off on a rotary evaporator. The siloxane precursor (V) was obtained at a 90-95 percent yield. The synthesis was monitored by the testing of small aliquots by the use of proton NMR.

The reaction of macromolecular anion (IV) with 1-(dimethylchlorosilyl)-2-(p,m-chloromethylphenyl) ethane to obtain siloxane precursor (V) can be represented as follows:

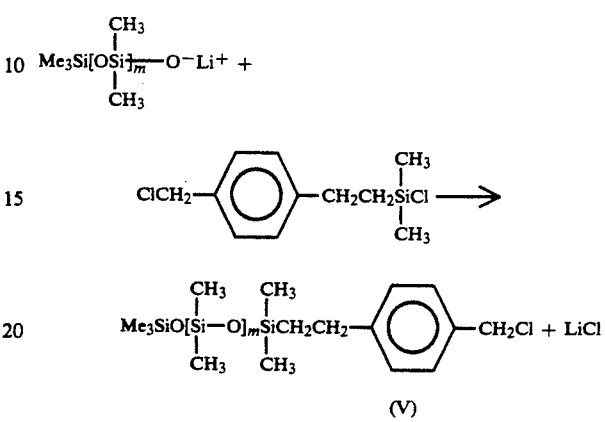

The final step involved in the synthesis of the macro siloxane monoiniferter compound involved the placement of a photoiniferter on the siloxane precursor (V) to obtain macro siloxane-monoiniferter compound (VI).

Siloxane precursor (V) (5000 molecular weight) (0.0182 mole) and an excess of sodium diethyldithiocarbamate (Et$_2$NCS$_2^-$Na$^+$) (6 grams) were stirred for 4-5 hours using THF as the solvent. Precipitation of sodium chloride was observed. THF was evaporated off on a rotary evaporator. A substantial amount of white solid along with the desired "macro" siloxane monoiniferter compound (VI) was obtained. The presence of the white solid was due to the formation of sodium chloride and an excess of sodium diethyldithiocarbamate. The solution was filtered using a Buchner funnel. Siloxane monoiniferter compound (VI) was obtained at a 90 percent yield. Proton NMR was used to monitor the reaction. Gel permeation chromatography of the siloxane monoiniferter compound (VI) showed a Mn=7269, a Mw=8466 and a polydispersity=1.16. Differential scanning calorimetry showed a Tg of −123° C.

The placement of the photoiniferter on the siloxane precursor (V) to obtain the "macro" siloxane-monoiniferter compound (VI) can be represented as follows:

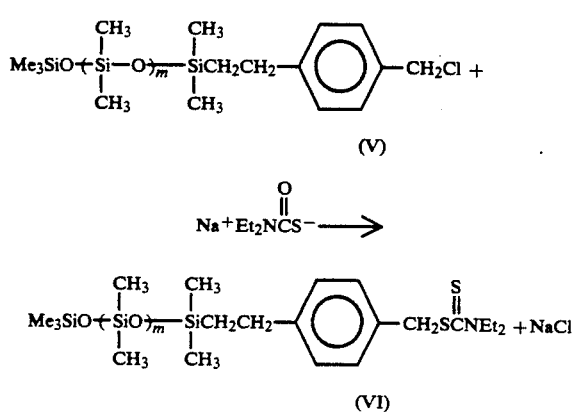

Examples 7-16 and 18-24 are representative of photopolymerized, vinyl siloxane block copolymers having triblock architecture. The end blocks are firmer, having a higher glass transition temperature (Tg). The siloxane midblock is more elastic, having a lower Tg. All parts and percentages are by weight unless otherwise indicated.

C. SYNTHESIS OF BLOCK COPOLYMERS UTILIZING "MACRO" SILOXANE DIINIFERTER COMPOUNDS

EXAMPLE 7

(MA/AA)-b-PDMS-b-(MA/AA)

A 4 ounce clear glass cylindrical reaction bottle was charged with 5 grams of "macro" siloxane diiniferter (which was prepared according to the method of Example 5, except for the substitution of the precursor of Example 3, 3000 molecular weight, for the precursor of Example 2), 7.25 grams of methyl acrylate, 3.25 grams of acrylic acid, and 17 grams of ethyl acetate. The mixture was purged with nitrogen for 3-4 minutes before sealing and placing the sealed bottle on a roller mechanism. The rotating, sealed bottle was exposed for 2.5 hours to ultraviolet radiation from six General Electric 15 watt black light lamps ($\lambda$max=300 nm) at a distance of 10 centimeters. After 2.5 hours of photolysis the solution became milky as the polymer started to precipitate out of solution. At that point, the ultraviolet source was turned off, the reaction bottle was unsealed, and 19.6 grams of methanol was added to the reaction bottle resulting in a homogeneous solution. Purging for 3-4 minutes with nitrogen followed before the reaction bottle was re-sealed and placed in the roller mechanism for further exposure to ultraviolet radiation which continued for 10 hours. The extent of conversion was monitored by determining percentage solids. Conversion in the range of 96% was obtained. The triblock copolymer consisted of 32 wt% of a 3000 molecular weight silicone midblock and 68 wt% of poly(2/1 methyl acrylate/acrylic acid). The copolymer was cast and dried as a thin film and characterized by differential scanning calorimetry (DSC) and gel permeation chromatography (GPC) the results of which are reported in Table II, Example 7.

Example 8

(VOAc/HPA/EOEA)-b-PDMS-b-(VOAc/HPA/EOEA)

The same procedure was followed as in Example 7 except that the second step involving the addition of methanol was excluded. The components charged into the reaction vessel were: 10 grams of "macro" siloxane diiniferter, 12.2 grams of vinyl acetate, 11 grams of hydroxy propyl acrylate, 7 grams of 2-ethoxyethyl acrylate, and 42 grams of ethyl acetate. The mixture was subjected to 50 hours of photolysis.

A portion of the resulting copolymer was cast and dried as a thin film and characterized by differential scanning calorimetry and gel permeation chromatography the results of which are reported in Table II, Example 8.

Example 9

(MA/NVP)-b-PDMS-b-(MA/NVP)

The same procedure was followed as in Example 7 except that the second step involving the addition of methanol was excluded. The components charged into the reaction vessel were: 2.5 grams of "macro" siloxane diiniferter, 8.4 grams of methyl acrylate, 4.2 grams of N-vinyl pyrrolidone, and 19 grams of ethyl acetate. The mixture was subjected to 48 hours of photolysis.

A portion of the resulting copolymer was cast and dried as a thin film and characterized by differential scanning calorimetry and gel permeation chromatography the results of which are reported in Table II, Example 9.

Example 10

(VOAc/HEA)-b-PDMS-b-(VOAc/HEA)

The same procedure was followed as in Example 7. The first set of components charged into the reaction vessel were: 6 grams of "macro" siloxane diiniferter, 9.5 grams of vinyl acetate, 4.2 grams of 2-hydroxy ethyl acrylate, and 20 grams of ethyl acetate. The mixture was subjected to 20 hours of photolysis before the addition of 19 grams of methanol, followed by 20 additional hours of photolysis.

A portion of the resulting copolymer was cast and dried as a thin film and characterized by differential scanning calorimetry and gel permeation chromatography the results of which are reported in Table II, Example 10.

Example 11

(VOAc/HPA)-b-PDMS-b-(VOAc/HPA)

The same procedure was followed as in Example 7. The first set of components charged into the reaction vessel were: 10.0 grams of "macro" siloxane diiniferter, 12.0 grams of vinyl acetate, 6.0 grams of 2-hydroxy propyl acrylate, and 26.0 grams of ethyl acetate. The mixture was subjected to 20 hours of photolysis before the addition of 22 grams of methanol, followed by 10 additional hours of photolysis.

A portion of the resulting copolymer was cast and dried as a thin film and characterized by differential scanning calorimetry and gel permeation chromatography the results of which are reported in Table II, Example 11.

Example 12

(MA/AA)-b-PDMS-b-(MA/AA)

The same procedure was followed as in Example 7. The first set of components charged into the reaction vessel were: 3.3 grams of "macro" siloxane diiniferter, 12.0 grams of methyl acrylate, 6.0 grams of acrylic acid, and 30.0 grams of ethyl acetate. The mixture was subjected to 4 hours of photolysis before the addition of 22.0 grams of methanol, followed by 10 additional hours of photolysis.

A portion of the resulting copolymer was cast and dried as a thin film and characterized by differential scanning calorimetry and gel permeation chromatography the results of which are reported in Table II, Example 12.

Example 13

(VOAc/HPA)-b-PDMS-b-(VOAc/HPA)

The same procedure was followed as in Example 7 except that the second step involving the addition of methanol was excluded. The components charged into the reaction vessel were: 5.0 grams of "macro" siloxane diiniferter, 10.0 grams of vinyl acetate, 5.0 grams of hydroxy propyl acrylate, and 20.0 grams of ethyl acetate. The mixture was subjected to 72 hours of photolysis.

A portion of the resulting copolymer was cast and dried as a thin film and characterized by differential scanning calorimetry and gel permeation chromatography the results of which are reported in Table II, Example 13.

Example 14

(VOAc/HPA)-b-PDMS-b-(VOAc/HPA)

The same procedure was followed as in Example 7. The first set of components charged into the reaction vessel were: 1.6 grams of "macro" siloxane diiniferter, 9.0 grams of vinyl acetate, 4.6 grams of hydroxy propyl acrylate, and 11.0 grams of ethyl acetate. The mixture was subjected to 20 hours of photolysis before the addition of 10 grams of methanol, followed by 10 additional hours of photolysis.

A portion of the resulting copolymer was cast and dried as a thin film and characterized by differential scanning calorimetry and gel permeation chromatography the results of which are reported in Table II, Example 14.

Example 15

(MA/AA)-b-PDMS-b-(MA/AA)

The same procedure was followed as in Example 7. The first set of components charged into the reaction vessel were: 4.7 grams of "macro" siloxane diiniferter, 5.4 grams of methyl acrylate, 5.2 grams of acrylic acid, and 20.0 grams of ethyl acetate. The mixture was subjected to 3 hours of photolysis before the addition of 21.0 grams of methanol, followed by 20 additional hours of photolysis.

A portion of the resulting copolymer was cast and dried as a thin film and characterized by differential scanning calorimetry and gel permeation chromatography the results of which are reported in Table II, Example 15.

Example 16

MMA-b-PDMS-b-MMA

The same procedure was followed as in Example 7 except that the second step involving the addition of methanol was excluded. The components charged into the reaction vessel were: 17.0 grams of "macro" siloxane diiniferter, 38.6 grams of methyl methacrylate, and 85 grams of ethyl acetate. The mixture was subjected to 92 hours of photolysis.

A portion of the resulting copolymer was cast and dried as a thin film and characterized by differential scanning calorimetry and gel permeation chromatography the results of which are reported in Table II, Example 16.

Example 17

MMA-b-(MA/AA)-b-PDMS-b-(MA/AA.)-b-MMA

The same procedure was followed as in Example 7. The first set of components charged into the reaction vessel were: 2.5 grams of "macro" siloxane diiniferter, 2.0 grams of methyl acrylate, 1.0 gram of acrylic acid, and 13.0 grams of ethyl acetate. The mixture was subjected to 16 hours of photolysis before the addition of 5.0 grams of methanol, followed by 7 additional hours of photolysis. The reaction bottle was removed from the roller mechanism and unsealed to allow the addition of methyl methacrylate, 2.9 grams of which was added. The resulting mixture was purged with nitrogen 3 to 4 minute and was photolyzed for an additional 16 hours.

A portion of the resulting copolymer was cast and dried as a thin film and characterized by differential scanning calorimetry and gel permeation chromatography the results of which are reported in Table II, Example 17.

Example 18

MMA-b-PDMS-b-MMA

The same procedure was followed as in Example 7 except that the second step involving the addition of methanol was excluded. The components charged into the reaction vessel were: 3.0 grams of "macro" siloxane diiniferter, 6.5 grams of methyl methacrylate, and 17.0 grams of ethyl acetate. The mixture was subjected to 46 hours of photolysis.

A portion of the resulting copolymer was cast and dried as a thin film and characterized by differential scanning calorimetry and gel permeation chromatography the results of which are reported in Table II, Example 18.

Example 19

St-b-PDMS-b-St

The same procedure was followed as in Example 7 except that the second step involving the addition of methanol was excluded. The components charged into the reaction vessel were: 3.0 grams of "macro" siloxane diiniferter, 6.5 grams of styrene, and 19.8 grams of ethyl acetate. The mixture was subjected to 72 hours of photolysis.

A portion of the resulting copolymer was cast and dried as a thin film and characterized by differential scanning calorimetry and gel permeation chromatography the results of which are reported in Table II, Example 19.

Example 20

(MA/AA)-b-PDMS-b-(MA/AA)

The same procedure was followed as in Example 7. The first set of components charged into the reaction vessel were: 7.5 grams of "macro" siloxane diiniferter, 28.0 grams of methyl acrylate, 14.0 grams of acrylic acid, and 62.0 grams of ethyl acetate. The mixture was subjected to 4 hours of photolysis before the addition of 50.0 grams of methanol, followed by 20 additional hours of photolysis.

A portion of the resulting copolymer was cast and dried as a thin film and characterized by differential scanning calorimetry and gel permeation chromatography the results of which are reported in Table II, Example 20.

Example 21

(MA/AA)-b-PDMS-b-(MA/AA)

The same procedure was followed as in Example 7. The first set of components charged into the reaction vessel were: 5.0 grams of "macro" siloxane diiniferter, 30.0 grams of methyl acrylate, 15.0 grams of acrylic acid, and 64.0 grams of ethyl acetate. The mixture was subjected to 4 hours of photolysis before the addition of 48.0 grams of methanol, followed by 32 additional hours of photolysis.

A portion of the resulting copolymer was cast and dried as a thin film and characterized by differential scanning calorimetry and gel permeation chromatography the results of which are reported in Table II, Example 21.

Example 22

(MA/NVP/AA)-b-PDMS-b-(MA/NVP/AA)

The same procedure was followed as in Example 7 except that the second step involving the addition of methanol was excluded. The components charged into the reaction vessel were: 4.0 grams of "macro" siloxane diiniferter, 9.0 grams of methyl acrylate, 1.0 gram of acrylic acid, 7.0 grams of N-vinyl pyrrolidone, and 34 grams of methyl ethyl ketone. The mixture was subjected to 10 hours of photolysis.

A portion of the resulting copolymer was cast and dried as a thin film and characterized by differential scanning calorimetry and gel permeation chromatography the results of which are reported in Table II, Example 22.

D. SYNTHESIS OF BLOCK COPOLYMER UTILIZING "MACRO" SILOXANE MONOINIFERTER

Example 24

MMA-b-PDMS

The same procedure was followed as in Example 7 except that the second step involving the addition of methanol was excluded. The components charged into the reaction vessel were: 40.0 grams of "macro" siloxane monoiniferter, prepared according to Example 6, 63.0 grams of methyl methacrylate and 140 grams of toluene. The mixture was subjected to 28 hours of photolysis.

A portion of the resulting copolymer was cast and dried as a thin film and characterized by differential scanning calorimetry and gel permeation chromatography the results of which are reported in Table II, Example 24.

TABLE II

| | | Composition[1], GPC and DSC Data | | | | | |
|---|---|---|---|---|---|---|---|
| Example | End Block[2] | Ratio of End Block to Si Mid-Block[3] | Percent Conversion | $Mn \times 10^{-3}$ | $Mw \times 10^{-3}$ | p | Tg (°C.) |
| 7  | 2/1 MA/AA           | 68:32 | 96  | 22.2 | 53.0  | 2.39 | −129, +60 |
| 8  | 10/5/3 VOAc/HPA/EOEA | 60:40 | 74  | 42.0 | 109.0 | 2.59 | −130, +10 |
| 9  | 2/1 MA/NVP          | 75:25 | 100 | 35.4 | 85.7  | 2.42 | +59 |
| 10 | 2/1 VOAc/HEA        | 60:40 | 85  |      |       |      |     |
| 11 | 2/1 VOAc/HPA        | 65:35 | 68  |      |       |      |     |
| 12 | 2/1 MA/AA           | 80:20 | 96  | 39.2 | 101.6 | 2.59 |     |
| 13 | 2/1 VOAc/HPA        | 54:46 | 72  | 24.6 | 46.3  | 1.88 | −134, −68, +26 |
| 14 | 2/1 VOAc/HPA        | 63:37 | 70  | 49.5 | 141.7 | 2.87 |     |
| 15 | 1/1 MA/AA           | 63:37 | 92  |      |       |      |     |
| 16 | MMA                 | 69:31 | 92  | 17.5 | 30.8  | 1.76 | −124, +105 |
| 17 | 3/2/1 MMA-b-(MA/AA) | 70:30 | 92  | 7.4  | 33.8  | 4.6  | −120, +58 |
| 18 | MMA                 | 61:39 | 90  | 16.5 | 27.5  | 1.7  | −118, +100 |
| 19 | St                  | 50:50 | 90  | —    | —     | —    | — |
| 20 | 2/1 MA/AA           | 85:15 | 96  | —    | —     | —    | — |
| 21 | 2/1 MA/AA           | 90:10 | 98  | 53.7 | 112.4 | 2.0  | −116, +62 |
| 22 | 9/7/1 MA/NVP/AA     | 81.19 | 100 | 26.3 | 78.2  | 3.0  | −121, +42, +75 |
| 23 | 9/7/1 MA/NVP/AA     | 89:11 | 100 | 29.2 | 80.5  | 2.8  | −120, +37, +76 |
| 24 | MMA                 | 60:40 | 86  | 17.5 | 42.0  | 2.4  | −122, +105 |

[1]All are prepared with a 3,000 MW polydimethyl siloxane midblock except example 24 which is a diblock possessing a 5000 molecular weight siloxane block
[2]VOAc = vinyl acetate, HPA = hydroxy propyl acrylate, EOEA = 2-ethoxyethyl acrylate,
MA = methyl acrylate, NVP = N-vinyl pyrrolidone, HEA = 2-hydroxyethyl acrylate,
AA = acrylic acid
[3]Corrected for unreacted monomer

Example 23

(MA/NVP/AA)-b-PDMS-b-(MA/NVP/AA)

The same procedure was followed as in Example 7 except that the second step involving the addition of methanol was excluded. The components charged into the reaction vessel were: 2.0 grams of "macro" siloxane diiniferter, 9.0 grams of methyl acrylate, 1.0 grams of acrylic acid, 7.0 grams of N-vinyl pyrrolidone, and 35 grams of methyl ethyl ketone. The mixture was subjected to 10 hours of photolysis.

A portion of the resulting copolymer was cast and dried as a thin film and characterized by differential scanning calorimetry and gel permeation chromatography the results of which are reported in Table II, Example 22.

E. RELEASE PROPERTY TESTING

In order to test the release properties of the polymers formed according to Examples 7 to 24, a portion of the solution from each polymerization was diluted to 10% solids with a 1:1 mixture of toluene and isopropanol, wire-wound rod (#6) coated on a 37 micrometer polyester film, dried (5 minutes at 65° C.), and equilibrated overnight under conditions of constant temperature (22° C.) and humidity (50% RH). Immediate release testing was conducted by laminating a 25 mm by 200 mm strip of the coated polyester film, coated side up to the stage of an Instrumentors, Inc. slip/peel tester (Model 3M90) with double coated tape, rolling a test strip of PSA coated tape onto the laminate using a 1.8 kg rubber roller, and measuring the force required to remove the PSA coated test tape at a 180° peel angle and at 225 cm/min.

Aged release testing was conducted in a similar manner except that the PSA coated test tape was allowed to dwell in contact with the coated polyester film for two days at either room temperature or 65° C. prior to removal. For these aged test tapes, re-adhesions were also measured by adhering the freshly peeled tape to a clean glass plate and measuring the peel adhesion in normal fashion using the same Instrumentors, Inc. slip/peel tester, again peeling at 225 cm/min and at a 180° peel angle. The value obtained was divided by the peel value for the same tape obtained directly from the roll and multiplied by 100 to provide a measurement in percent of the retained adhesion. These measurements were taken to determine whether a drop in the adhesion value occurred due to undesirable contamination of the adhesive surface by the release coating. The results of these measurements are reported in Table III.

The PSA coated tapes used in conducting these tests were chosen from A) a solvent coated rubber resin adhesive on creped saturated paper, B) an acrylic PSA coated on a cellulose acetate, C) a waterborne rubber resin adhesive coated on a creped saturated paper, D) an acrylic PSA coated on a biaxially oriented polypropylene, E) a tackified styrene/isoprene block copolymer PSA coated on a biaxially oriented polypropylene backing and F) an acrylic PSA coated on a non-woven rayon backing.

The data contained in Table III demonstrates the release and readhesion properties for various coated substrates and tape systems. The data demonstrates excellent release and readhesion properties for a substantial number of coated substrates and sample tapes including Examples 8B, 11B, 12A, 12B, 13B, 14C, 14E, 15A, 15B, 17F, 18B, 18F, 20, 21, and 25. However, not all the systems were optimized to provide desirable release and readhesion properties. Thus, the data demonstrates that a particular release coating will not necessarily function as well for every adhesive tape. Rather, the particular copolymer must be specifically tailored (i.e., by adjusting the vinyl block composition, weight percent, etc.) in order to function properly with a particular adhesive. This is possible using these easily tailorable copolymers as the release coatings of the invention.

F. INK RECEPTIVITY TESTING

Ink receptivity of the polymers formed according to Examples 7 to 24 was assessed by drawing on the coated sheets described above with test pens containing water based inks. The test pens used included a blue 3M Nonpermanent Transparency Marking Pen #00-0015-1012-2, a black Paper Mate® Nylon Fiber Point 862-11, and a red Sanford® EXPRESSO® Extra Fine Point TM 39002. The amount of dewetting (i.e. discontinuities) observed for lines drawn by these pens was used to characterize ink receptivity, with an excellent classification given for no dewetting, good for slight dewetting, fair for moderate (<50%) dewetting, poor for substantial dewetting but still readable, and very poor for complete dewetting. Results of the ink receptivity test for Examples 7 to 24 are reported in Table III.

TABLE III

| | | Release (N/dm) | | | Readhesion[2] (%) | | |
|---|---|---|---|---|---|---|---|
| Example | Tape | Immediate | 2 Day R.T. | 2 Day 65° C. | 2 Day R.T. | 2 Day 65° C. | Ink Receptivity[1] |
| 7 | A | 0.5 | 0.8 | 5.4 | 77 | 72 | p |
|   | B | 0.3 | 0.5 | 0.9 | 91 | 71 | p |
| 8 | A | 0.5 | 16.2 | 23.9 | 62 | 71 | g |
|   | B | 1.4 | 14.6 | 14.8 | 94 | 69 | g |
| 9 | A | 0.5 | 0.3 | 13.6 | 60 | 57 | g |
|   | C | 2.2 | 2.1 | 4.2 | 60 | 18 | g |
| 10 | A | 0.1 | 4.5 | 4.8 | 42 | 42 | e |
|   | B | 0.3 | 1.3 | 0.5 | 57 | 51 | e |
| 11 | A | 15.7 | 47.6 | 27.3 | 70 | 77 | g |
|   | B | 7.0 | 37.1 | 43.7 | 109 | 106 | g |
| 12 | A | 6.0 | 13.1 | 18.5 | 75 | 85 | g |
|   | B | 0.9 | 6.1 | 9.4 | 100 | 97 | e |
| 13 | A | 1.3 | 52.6 | 17.4 | 58 | 58 | e |
|   | B | 0.5 | 1.4 | 1.0 | 91 | 109 | e |
|   | D | 1.1 | 5.0 | 3.9 | 73 | 80 | e |
| 14 | B | 1.6 | 11.4 | 26.2 | — | 94 | e |
|   | E | 1.2 | 3.4 | 22.8 | 101 | 73 | e |
| 15 | A | 0.3 | 0.4 | 7.1 | 58 | 60 | e |
|   | B | 0.8 | 0.8 | 0.8 | 100 | 71 | e |
| 16 | F | 3.3 | 12.6 | 12.6 | 110 | 95 | p |
| 17 | F | 5.5 | 17.5 | 18.6 | 100 | 95 | g |
| 18 | B | 1.0 | 15.3 | 23.0 | 86 | 91 | p |
|   | F | 4.5 | 9.6 | 11.6 | 90 | 85 | p |
| 19 | B | 0.7 | 13.6 | 18.9 | 91 | 97 | p |
|   | F | 2.0 | 7.3 | 11.9 | 70 | 70 | p |
| 20 | B | 2.2 | 12.3 | 18.8 | 109 | 91 | e |
| 21 | B | 3.3 | 15.7 | 23.8 | 109 | 94 | e |
| 22 | A | 0.9 | 0.8 | 16.6 | 25 | 30 | e |
|   | E | 2.1 | 4.9 | 8.8 | 35 | 35 | e |
| 23 | A | 3.6 | 8.3 | 23.7 | 60 | 75 | e |
|   | E | 4.4 | 19.1 | 28.9 | 44 | 47 | e |
| 24 | A | 0.4 | 12.6 | 24.1 | 55 | 45 | vp |
| 25 | B | 0.9 | 7.1 | 8.8 | 126 | 109 | e |
| 28 | B | 0.5 | 0.8 | 0.8 | 67 | 52 | e |
| 29 | B | 1.3 | 5.8 | 3.6 | 89 | 73 | e |
| 30 | B | 2.3 | 9.2 | 3.8 | 99 | 81 | e |
| 31 | A | 2.6 | 6.9 | 16.5 | 86 | 84 | e |

TABLE III-continued

| | | Release, Readhesion, and Ink Receptivity | | | | | |
|---|---|---|---|---|---|---|---|
| | | Release (N/dm) | | | Readhesion[2] (%) | | |
| Example | Tape | Immediate | 2 Day R.T. | 2 Day 65° C. | 2 Day R.T. | 2 Day 65° C. | Ink Receptivity[1] |
| 32 | A | 3.1 | 7.7 | 17.4 | 88 | 89 | e |

[1] e = excellent; g = good; f = fair; p = poor; vp = very poor
[2] Readhesion is given in percentage of th initial adhesion
[3] N/dm = Newtons per decimeter Examples 7 to 24 demonstrate the reduction to practice and optimization of formulations yielding glassy and hydrophilic, but non-ionic, endblocks. Chemistry leading to ionic functionality in the endblocks (e.g., a post-polymerization reaction of an MA/N,N-dimethylaminoethyl methacrylate endblock with propane sultone) can also yield ink-receptive low adhesion backsizes (LABs) and release coatings.

Example 25 below describes the preparation of a block copolymer possessing ionic functionality.

Example 25

Water Soluble (MA/AA)-b-PDMS-(MA/AA)

The triblock polymer of Example 12 was modified to obtain a water soluble formulation by a neutralization technique. The solvents were removed from the polymer prepared according to Example 12 using a rotary evaporator. A 25% solids solution of the dried down polymer material was prepared by dissolving 15 grams of the dried down polymer material in 45 grams of methylethylketone (MEK). Forty grams of this solution (containing 10 grams of a polymer and 32 mequivalent of acid functionality) was added to a solution of 3.0 grams (50 mmole) of concentrated ammonium hydroxide in 60 grams of water. The resulting mixture was agitated for 16 hours at room temperature. The MEK was stripped from the resulting solution on a rotary evaporator using an aspirator vacuum. Dilution with 25 grams of water yielded a hazy 10.7 percent solids solution. The 10.7 percent solids solution was coated onto a 37 micrometer polyester film using a #6 Mayer Rod, dried 5 minutes at 65° C., and conditioned overnight under conditions of constant temperature (22° C.) and humidity (50% RH). Release and Readhesion values against test tape B (acrylic PSA coated on a cellulose acetate) and the level of ink receptivity are reported in Table III.

Examples 26-30

Preparation of Vinyl-Siloxane Copolymer Blends

Example 26

Synthesis of MA/AA Random Copolymer For Blending With Block Copolymer MA/AA-PDMS-MA/AA Into a 4 ounce clear glass cylindrical reaction bottle was charged 12 grams of methyl acrylate, 6 grams of acrylic acid, 32 grams of isopropyl alcohol, and 0.05 grams of 2,2'-azobisisobutyronitrile (AIBN). The head space was flushed with nitrogen for 2 minutes at 1 liter/min, after which the bottle was sealed. The sealed bottle containing the clear solution was tumbled in a constant temperature bath for 16 hours at 55° C. resulting in a viscous clear solution. To 13.9 grams of this solution was added 36.0 grams of methyl ethyl ketone to obtain a 10.5% solid solution.

Example 27

10.0 grams of MA/AA-b-PDMS-b-MA/AA prepared according to Example 12 was combined with 19.0 grams of methyl ethyl ketone to obtain a 10.0% solid solution of the triblock.

Example 28

Into a 4 ounce bottle was charged 2.5 grams of the random copolymer prepared according to Example 26 and 7.5 grams of the triblock copolymer prepared according to Example 27 to obtain a hazy blend of MA/AA random copolymer and MA/AA-b-PDMS-b-MA/AA triblock copolymer.

Example 29

The same procedure was followed as in Example 28. The charges were 5.0 grams of solution prepared according to Example 26 and 5.0 grams of solution prepared according to Example 27. A clear blend of MA/AA random copolymer and MA/AA-b-PDMS-b-MA/AA triblock copolymer was obtained.

Example 30

The same procedure was followed as in Example 28. The charges were 7.5 grams of solution prepared according to Example 26 and 2.5 grams of solution prepared according to Example 27. A clear blend of MA/AA random copolymer and the MA/AA-b-PDMS-b-MA/AA triblock copolymer was obtained.

Examples 31-32

Unfilled and Filled (MA/AA)-b-PDMS-b-(MA/AA) Coatings

Two grams of the 25% solids MEK solution of triblock polymer prepared according to Example 25 was diluted to 5% solids with 8 grams of additional MEK. To half of this material (5 grams containing 0.25 grams of polymer) was added 25 milligrams (10% on polymer) of a finely powdered calcium carbonate filler available from Horton-Earl Company under the tradename Atomite. The resulting suspension (Example 32) as well as the unfilled solids solution (Example 31) were coated separately onto 37 micrometer polyester films using a #6 Mayer Rod, dried 5 minutes at 65° C. and conditioned overnight under conditions of constant temperature (22° C.) and humidity (50% RH). Release and Readhesion values against test tape A (a rubber resin PSA on creped saturated paper) and the level of ink receptivity are reported in Table III. The ability to write on these coatings with a black medium point Bic ® Round Stic ® roller ball pen (#GSM11) was also assessed. No marking occurred on the unfilled coating (Example 31) under medium pressure, while good marking occurred on the filled coating (Example 32). Release and readhesion data are reported in Table III.

A series of experiments were conducted wherein a solvent borne photoiniferter prepared triblock was blended with a waterborne solution of the same polymer. Ratios were varied to yield 100/0, 90/10, 80/20, 60/40, 40/60, 20/80, 10/90, and 0/100 solvent to water borne compositions. These coatings prepared in Examples 33–40 demonstrate a systematic variation in release peformance, thus representing a futher technique for tailoring release performance in these systems.

Examples 33-40

Five grams of the 25% solids MEK solution of triblock polymer prepared in Example 25 was diluted to 5% solids with 20 grams additional MEK to give a solventborne composition. Fifteen grams of the 10.7% solids aqueous solution of neutralized triblock polymer prepared in Example 25 was diluted to 5% solids with 17.1 grams additional water to give a waterborne composition. These two compositions were blended in small vials in the ratios shown below in Table IV, shaken to achieve homogeniety, then coated onto a 37 micrometer polyester film using a #6 Mayer Rod, dried five minutes at 65° C., and conditioned overnight under conditions of constant temperature (22° C.) and humidity (50% RH). Release and readhesion values against test tape A (a rubber resin PSA on creped saturated paper) and the level of ink receptivity are reported in Table V. These results show that the level of release can be adjusted in systematic fashion for a given polymer by variation in the coating medium.

TABLE IV

| Example | Solventborne Composition (grams) | Waterborne Composition (grams) |
|---|---|---|
| 33 | 5 | 0 |
| 34 | 4.5 | 0.5 |
| 35 | 4 | 1 |
| 36 | 3 | 2 |
| 37 | 2 | 3 |
| 38 | 1 | 4 |
| 39 | 0.5 | 4.5 |
| 40 | 0 | 5 |

TABLE V

| Example | Tape | Release (N/dm) Immediate | 2 day R.T. | 2 day 65° C. | Readhesion 2 day R.T. | 2 day 65° C. | Ink Receptivity |
|---|---|---|---|---|---|---|---|
| 33 | A | 2.3 | 7.6 | 15.2 | 88 | 95 | E |
| 34 | A | 4.7 | 9.8 | 18.4 | 89 | 91 | E |
| 35 | A | 4.1 | 8.2 | 15.8 | 93 | 95 | E |
| 36 | A | 3.9 | 10.5 | 17.2 | 89 | 95 | E |
| 37 | A | 8.2 | 13.7 | 23.2 | 86 | 92 | E |
| 38 | A | 10.7 | 19.0 | 28.7 | 83 | 92 | E |
| 39 | A | 9.6 | 17.2 | del | 84 | — | E |
| 40 | A | 9.6 | 16.6 | del | 84 | — | E | del = delamination of the LAB coating from the polyester

While this invention has been described in connection with specific embodiments, it should be understood that it is capable of further modification. The claims herein are intended to cover those variations which one skilled in the art would recognize as the chemical equivalent of what has been described here.

We claim:

1. A coated sheet material wherein the release agent covers a first portion of one side and a normally tacky and pressure-sensitive adhesive covers a second portion of the same side wherein said release coating comprises a block copolymer having a formula selected from the group consisting of AB and ABA, wherein A comprises at least one vinyl polymeric block, wherein each polymeric block consists essentially of polymerized free radically polymerizable monomer, wherein each polymeric block has a $T_g$ or $T_m$ above about −20° C. and wherein A comprises at least about 40 weight percent of said block copolymer, wherein B is a siloxane polymeric block having a number average molecular weight above about 1000, and wherein the weight percent of the siloxane polymeric block is great enough to provide said block copolymer with a surface release value not greater than about 50 Newtons/dm;

wherein said block polymer has the formula

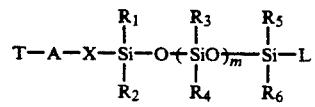

and is made by the utilization of an iniferter represented by the formula

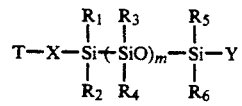

wherein:

T and X are organic groups selected so that the T—X bond is capable of dissociating upon being subjected to an appropriate energy source to form a terminator free radical of the formula T· and an initiator free radical of the formula

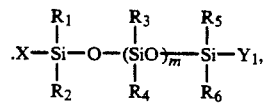

said initiator free radical being sufficiently reactive to initiate free radical polymerization of free radically polymerizable monomer and said terminator free radical being sufficiently capable of initiating free radical polymerization of free radically polymerizable monomer but capable of rejoining with said initiator free radical or a free radical polymer segment free radically polymerized with said initiator free radical;

$R_1$, $R_2$, $R_5$ and $R_6$ are monovalent moieties selected from the group consisting of hydrogen, $C_{1-4}$ alkyl, $C_{1-4}$ alkoxy and aryl which can be the same or are different;

$R_3$ and $R_3$ are monovalent moieties which can be the same or different selected from the group consisting of $C_{1-4}$ alkyl, $C_{1-4}$ fluoroalkyl including at least one fluorine atom and aryl;

$R_1$, $R_2$, $R_3$, $R_5$ and $R_6$ are selected so that they do not prevent said initiator free radical from initiating free radical polymerization or the combining of said terminator free racial with said initiator free radical or a polymer free radical segment including said initiator free radical;

Y is selected from the group consisting of —X—T and —Z wherein X and T are defined above and Z is an organic moiety that will not dissociate to form free radicals when subjected to said energy source;

L is selected from the group consisting of —X—A—T and —Z wherein X and T are defined above and Z is an organic moiety that will not dissociate to form free radicals when subjected to said energy source;

$Y_1$ is selected from the group consisting of —X. and Z; and m is an integer of at least 10.

2. The coated sheet material of claim 1 wherein the sheet is an elongate strip having spaced alternating areas of release agent and adhesive.

3. The coated sheet material of claim 2 wherein the sheet is generally rectangular, the release agent being present in a band adjacent one edge and the pressure-sensitive adhesive being present in a band adjacent the opposite edge.

4. A fanfolded web formed from the coated sheet material of claim 1, the adhesive on each segment of the web being in contact with the release agent on an immediately adjacent segment.

5. A coated sheet material wherein an adhesive is present in a band adjacent to one edge of the sheet, wherein a release agent is on one side of the sheet and the adhesive is on the other side wherein said release coating comprises a block copolymer having a formula selected from the group consisting of AB and ABA, wherein A comprises at least one vinyl polymeric block, wherein each polymeric block consists essentially of polymerized free radically polymerizable monomer, wherein each polymeric block has a $T_g$ or $T_m$ above about $-20°$ C. and wherein A comprises at least about 40 weight percent of said block copolymer, wherein B is a siloxane polymeric block having a number average molecular weight above about 1000, and wherein the weight percent of the siloxane polymeric block is great enough to provide said block copolymer with a surface release value not greater than about 50 Newtons/dm;

wherein said block polymer has the formula

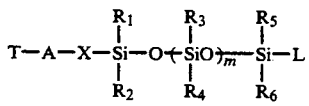

and is made by the utilization of an inferior represented by the formula

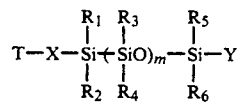

wherein:

T and X are organic groups selected so that the T—X bond is capable of dissociating upon being subjected to an appropriate energy source to from a terminator free radical of the formula T· and an initiator free radical of the formula

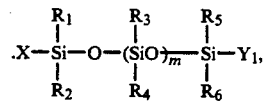

said initiator free radical being sufficiently reactive to initiate said free radical polymerization of free radically polymerizable monomer and said terminator free radical being insufficiently capable of initiating free radical polymerization of free radically polymerizable monomer but capable of rejoining with said initiator free radical or a free radical polymer segment free radically polymerized with said initiator free radical;

$R_1$, $R_2$, $R_5$ and $R_6$ are monovalent moieties selected from the group consisting of hydrogen, $C_{1-4}$ alkyl, $C_{1-4}$ alkoxy and aryl with can be the same or are different;

$R_3$ and $R_4$ are monovalent moieties which can be the same or different selected from the group consisting of $C_{1-4}$ alkyl, $C_{1-4}$ fluoroalkyl including at least one fluorine atom and aryl;

$R_1$, $R_2$, $R_4$, $R_5$ and $R_6$ are selected so that they do not prevent said initiator free radical from initiating free radical polymerization or the combining of said terminator free radical segment including said initiator free radical;

Y is selected form the group consisting of —X—T and —Z wherein X and T are defined above and Z is an organic moiety that will not dissociate to form free radicals when subjected to said energy source;

L is selected from the group consisting of —X—A—T and —Z wherein X and T are defined above and Z is an organic moiety that will not dissociate to form free radicals when subjected to said energy source;

$Y_1$ is selected from the group consisting of —X. and Z; and m is an integer of at least 10.

6. A stack of individual sheets formed from the coated sheet material of claim 5, the adhesive bands of adjacent sheets lying along opposite edges.

* * * * *